(12) United States Patent
Chen et al.

(10) Patent No.: US 12,339,549 B2
(45) Date of Patent: Jun. 24, 2025

(54) ARRAY SUBSTRATE AND TOUCH DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yuqiong Chen, Beijing (CN); Yong Zhang, Beijing (CN); Jian Wang, Beijing (CN); Jian Lin, Beijing (CN); Xianglei Qin, Beijing (CN); Limin Zhang, Beijing (CN); Zhichao Yang, Beijing (CN); Zepeng Sun, Beijing (CN); Yashuai An, Beijing (CN); Liangzhen Tang, Beijing (CN); Lingfang Nie, Beijing (CN); Honggui Jin, Beijing (CN); Zhilong Duan, Beijing (CN); Li Tian, Beijing (CN); Xiaofeng Yin, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 701 days.

(21) Appl. No.: 17/772,694

(22) PCT Filed: Jul. 8, 2021

(86) PCT No.: PCT/CN2021/105103
§ 371 (c)(1),
(2) Date: Apr. 28, 2022

(87) PCT Pub. No.: WO2022/033249
PCT Pub. Date: Feb. 17, 2022

(65) Prior Publication Data
US 2022/0373848 A1 Nov. 24, 2022

(30) Foreign Application Priority Data

Aug. 11, 2020 (CN) .......................... 202010799528.5

(51) Int. Cl.
G02F 1/1362 (2006.01)
G02F 1/1333 (2006.01)
(Continued)

(52) U.S. Cl.
CPC .. *G02F 1/136227* (2013.01); *G02F 1/133345* (2013.01); *G02F 1/13338* (2013.01);
(Continued)

(58) Field of Classification Search
CPC ......... G02F 1/136227; G02F 1/134354; G02F 1/133345; G02F 1/13338; G02F 1/133512;
(Continued)

(56) References Cited

U.S. PATENT DOCUMENTS 9,342,166 B2  5/2016  Cho et al.
9,619,066 B2  4/2017  Gwon et al.
(Continued)

FOREIGN PATENT DOCUMENTS

CN  102799038 A  * 11/2012  ....... G02F 1/136204
CN  104699351 A    6/2015
(Continued)

*Primary Examiner* — Michael H Caley
*Assistant Examiner* — William D Peterson
(74) *Attorney, Agent, or Firm* — LEASON ELLIS LLP

(57) ABSTRACT

An array substrate and a touch display device. The array substrate includes a touch signal line, a common electrode and a first pixel electrode on a substrate. The first pixel electrode includes a first edge and a second edge arranged along the first direction and extending along the second direction, the touch signal line extends along the second direction, and the touch signal line is located between the
(Continued)

first edge and the second edge. The via hole connection part of the touch signal line is electrically connected to the common electrode through the touch line via hole, and a size of the via hole connection part in the first direction is greater than a size of a portion of the touch signal line in the first direction, and the portion of the touch signal line is adjacent to the via hole connection part.

20 Claims, 13 Drawing Sheets

(51) Int. Cl.
*G02F 1/1335* (2006.01)
*G02F 1/1343* (2006.01)
*G06F 3/041* (2006.01)

(52) U.S. Cl.
CPC .. *G02F 1/133512* (2013.01); *G02F 1/134354* (2021.01); *G02F 1/136286* (2013.01); *G06F 3/0412* (2013.01); *G06F 3/04164* (2019.05)

(58) Field of Classification Search
CPC ........... G02F 1/136286; G06F 3/04164; G06F 3/0412
USPC .......................................................... 257/59
See application file for complete search history.

(56) References Cited

U.S. PATENT DOCUMENTS

| | | | |
|---|---|---|---|
| 9,869,909 | B2 | 1/2018 | Umeda et al. |
| 10,338,717 | B2 | 7/2019 | Choi et al. |
| 10,365,511 | B2 | 7/2019 | Yang et al. |
| 10,558,309 | B2 | 2/2020 | Zhou et al. |
| 10,712,855 | B2 | 7/2020 | Ma et al. |
| 11,216,099 | B2 | 1/2022 | Zhang et al. |
| 2021/0018781 | A1 | 1/2021 | Chen et al. |
| 2022/0057896 | A1 | 2/2022 | Yoshida |

FOREIGN PATENT DOCUMENTS

| | | | | |
|---|---|---|---|---|
| CN | 104793401 A | | 7/2015 | |
| CN | 104793421 A | | 7/2015 | |
| CN | 105373272 A | | 3/2016 | |
| CN | 106876415 A | | 6/2017 | |
| CN | 106932940 A | | 7/2017 | |
| CN | 108628047 A | | 10/2018 | |
| CN | 109031815 A | | 12/2018 | |
| CN | 109582179 A | * | 4/2019 | ......... G02F 1/13338 |
| CN | 110349976 A | | 10/2019 | |
| CN | 212255943 U | | 12/2020 | |
| DE | 102016211868 B4 | | 10/2019 | |
| JP | 3194343 U | | 11/2014 | |
| KR | 1020130050446 A | | 5/2013 | |
| WO | 2018207660 A1 | | 11/2018 | |

* cited by examiner

ARRAY SUBSTRATE AND TOUCH DISPLAY DEVICE

CROSS REFERENCE TO RELATED APPLICATION

This application is a U.S. National Stage Application under 35 U.S.C. § 371 of International Patent Application No. PCT/CN2021/105103 filed Jul. 8, 2021, which claims the benefit of priority of Chinese Patent Application number 202010799528.5 filed Aug. 11, 2020, both of which are incorporated by reference in their entireties. The International Application was published on Feb. 17, 2022, as International Publication No. WO 2022/033249 A1.

TECHNICAL FIELD

Embodiments of the present disclosure relate to an array substrate and a touch display device.

BACKGROUND

Touch screens can be seen everywhere around us. The touch screen saves space and is easy to carry, and has better human-machine interaction. Among various types of touch screens, capacitive touch screen is widely used due to advantages of strong sensitivity and being capable of achieving multi-touch.

The working principle of capacitive touch screen is as follows: a conductive material is disposed on the surface of a substrate and serves as a touch electrode; when a touch object (e.g., a user's finger) touches the touch screen, the capacitance of the touch electrode at the touch point changes, and the position of the touch point on the touch screen may be detected according to the change.

Capacitive touch technology may be divided into touch technology based on mutual-capacitance principle and touch technology based on self-capacitance principle. Compared to the touch technology based on mutual-capacitance principle, the touch technology based on self-capacitance principle has higher accuracy and higher signal-to-noise ratio.

In-cell touch screen is a touch screen with a touch electrode disposed inside the display panel. The in-cell touch screen has higher integration and is lighter and thinner, therefore, the in-cell touch screen has a wide application prospect.

SUMMARY

The embodiments of the present disclosure provide an array substrate and a touch display device, the array substrate may avoid color deviation.

At least one embodiment of the present disclosure provides an array substrate, including: a substrate; a plurality of first display signal lines and a plurality of second display signal lines on the substrate, wherein, the plurality of first display signal lines extend along a first direction and are sequentially arranged along a second direction different from the first direction, and the plurality of second display signal lines extend along the second direction and are sequentially arranged along the first direction, the plurality of second display signal lines intersect the plurality of first display signal lines to define a plurality of sub-pixel regions; a touch signal line on the substrate, wherein, the touch signal line extends along the second direction; a first insulating layer and a common electrode on the substrate, wherein, the first insulating layer is located between the touch signal line and the common electrode in a direction perpendicular to the substrate, and the touch signal line is electrically connected to the common electrode through a touch line via hole penetrating through the first insulating layer; and a plurality of pixel electrodes on the substrate, wherein, the plurality of pixel electrodes are respectively located in the plurality of sub-pixel regions, wherein, the plurality of sub-pixel regions comprise a first sub-pixel region, the plurality of pixel electrodes comprise a first pixel electrode, the first pixel electrode is located within the first sub-pixel region, and the first pixel electrode comprises a first edge and a second edge arranged along the first direction and extending along the second direction, an orthogonal projection of the touch signal line on the substrate is located between orthogonal projections of the first edge and the second edge on the substrate; an orthogonal projection of the touch line via hole on the substrate is at least partially located between orthogonal projections of adjacent pixel electrodes on the substrate, the touch signal line comprises a via hole connection part electrically connected to the common electrode at the touch line via hole, and a size of the via hole connection part in the first direction is greater than a size of a portion included in the touch signal line in the first direction, and the portion included in the touch signal line is adjacent to the via hole connection part; the first pixel electrode is a pixel electrode closest to the via hole connection part among the plurality of pixel electrodes, the first pixel electrode further comprises a third edge between the first edge and the second edge, the third edge extends along the first direction, and the third edge has a first recess, an orthogonal projection of the first recess on the substrate accommodates at least a portion of an orthogonal projection of the via hole connection part on the substrate.

In the array substrate provided by at least embodiment of the present disclosure, the first sub-pixel region comprises a first region and a second region surrounding the first region; in the first direction, distances between the orthogonal projection of the touch signal line and two second display signal lines adjacent to the touch signal line in the first region are not equal.

In the array substrate provided by at least embodiment of the present disclosure, the array substrate comprises a plurality of touch signal lines, and the orthogonal projection of one of the plurality of touch signal lines on the substrate is located between the orthogonal projections of the first edge and the second edge included in the first pixel electrode in the first sub-pixel region in each column of sub-pixel regions on the substrate.

In the array substrate provided by at least embodiment of the present disclosure, an orthogonal projection of the via hole connection part on the substrate is not overlapped with an orthogonal projection of the first pixel electrode on the substrate.

In the array substrate provided by at least embodiment of the present disclosure, an edge of the first recess is parallel to an edge of the via hole connection part adjacent thereto.

In the array substrate provided by at least embodiment of the present disclosure, the array substrate comprises a plurality of touch signal lines on the substrate; the plurality of pixel electrodes comprise a first row of pixel electrodes and a second row of pixel electrodes that are adjacent to each other, both the first row of pixel electrodes and the second row of pixel electrodes extend along the first direction and are sequentially arranged along the second direction; both the first row of pixel electrodes and the second row of pixel electrodes intersect at least two touch signal lines, at least one of the at least two touch signal lines has the via hole connection part between the first row of pixel electrodes and the second row of pixel electrodes, and at least another one of the at least two touch signal lines does not have the via hole connection part between the first row of pixel electrodes and the second row of pixel electrodes.

In the array substrate provided by at least embodiment of the present disclosure, the first row of pixel electrodes is closer to the via hole connection part than the second row of pixel electrodes, and a pixel electrode closest to the via hole connection part among the first row of pixel electrodes has the first recess.

In the array substrate provided by at least embodiment of the present disclosure, a pixel electrode adjacent to the pixel electrode closest to the via hole connection part in the first row of pixel electrodes has a second recess facing the second row of pixel electrodes.

In the array substrate provided by at least embodiment of the present disclosure, the array substrate comprises a first electrode, the first electrode is the common electrode or the first pixel electrode, the first electrode comprises a plurality of strip electrodes, and the plurality of strip electrodes extend along the second direction; in the first sub-pixel region, the orthogonal projection of the touch signal line is at least partially located between orthogonal projections of adjacent strip electrodes in the first direction on the substrate.

At least one embodiment of the present disclosure further provides an array substrate, comprising: a substrate; a plurality of first display signal lines and a plurality of second display signal lines on the substrate, wherein, the plurality of first display signal lines extend along a first direction and are sequentially arranged along a second direction different from the first direction, and the plurality of second display signal lines extend along the second direction and are sequentially arranged along the first direction, the plurality of second display signal lines and the plurality of first display signal lines intersect to define a plurality of sub-pixel regions; a touch signal line on the substrate, wherein, the touch signal line extends along the second direction; a common electrode on the substrate, and electrically connected to the touch signal line; and a plurality of pixel electrodes located on the substrate, wherein, the plurality of pixel electrodes are respectively located in the plurality of sub-pixel regions, wherein, the plurality of sub-pixel regions comprise a first sub-pixel region, the plurality of pixel electrodes comprise a first pixel electrode, the first pixel electrode is located in the first sub-pixel region, and the first pixel electrode comprises a first edge and a second edge arranged along the first direction and extending along the second direction, an orthogonal projection of the touch signal line on the substrate is located between orthogonal projections of the first edge and the second edge on the substrate; the array substrate comprises a first electrode, the first electrode is the common electrode or the first pixel electrode, the first electrode comprises a plurality of strip electrodes, and the plurality of strip electrodes extend along the second direction; in the first sub-pixel region, the orthogonal projection of the touch signal line is at least partially located between orthogonal projections of adjacent strip electrodes in the first direction on the substrate; the first sub-pixel region comprises a first region and a second region surrounding the first region; the plurality of strip electrodes comprise a first strip electrode adjacent to the touch signal line, the first strip electrode has a first strip electrode bending part in the first region, the touch signal line has a first touch line bending part in the first region, the first touch line bending part and the first strip electrode bending part bend toward a same direction in the first region, an orthogonal projection of the first touch line bending part on the substrate and an orthogonal projection of the first strip electrode bending part on the substrate are sequentially arranged in the first direction, and a bending angle of the first touch line bending part is greater than a bending angle of the first strip electrode bending part.

In the array substrate provided by at least embodiment of the present disclosure, the first strip electrode bending part is located on a first side of the first touch line bending part, and the first touch line bending part bend along a direction away from the first strip electrode bending part; along a direction from one end to another end of the first strip electrode, an distance between the orthogonal projection of the first touch line bending part and the orthogonal projection of the first strip electrode bending part firstly decreases and then increases.

In the array substrate provided by at least embodiment of the present disclosure, the first strip electrode bending part has a sharp end extending towards the first touch line bending part, and the first touch line bending part has an arced end extending in a direction away from the sharp end.

In the array substrate provided by at least embodiment of the present disclosure, the orthogonal projection of the first strip electrode bending part is not overlapped with the orthogonal projection of the first touch line bending part.

In the array substrate provided by at least embodiment of the present disclosure, the plurality of strip electrodes further comprises a second strip electrode adjacent to the touch signal line, the second strip electrode has a second strip electrode bending part in the first region, the first strip electrode bending part, the second strip electrode bending part and the first touch line bending part located therebetween bend toward a same direction in the first region, an orthogonal projection of the second strip electrode bending part on the substrate and the orthogonal projection of the first touch line bending part are sequentially arranged in the first direction, and a bending angle of the second strip electrode bending part is less than a bending angle of the first touch line bending part.

In the array substrate provided by at least embodiment of the present disclosure, further comprising a plurality of switch elements on the substrate, wherein, the plurality of switch elements are respectively located in the plurality of sub-pixel regions, the plurality of switch elements comprise a first switch element, and the first switch element is located in the first sub-pixel region, the touch signal line has a second touch line bending part, the second touch line bending part is located between the first touch line bending part and the first switch element in the second direction, and the second touch line bending part is located between adjacent switch elements in the first direction.

In the array substrate provided by at least embodiment of the present disclosure, a bending angle of the second touch line bending part is greater than a bending angle of the first touch line bending part.

In the array substrate provided by at least embodiment of the present disclosure, the first strip electrode has a third strip electrode bending part, the third strip electrode bending part is located between the second touch line bending part and the first switch element in the first direction, and a bending direction of the third strip electrode bending part is opposite to a bending direction of the second touch line bending part.

In the array substrate provided by at least embodiment of the present disclosure, each switch element comprises a gate electrode, a source electrode and a drain electrode, and an orthogonal projection of the source on the substrate comprises a U-shaped structure.

At least one embodiment of the present disclosure provides an array substrate, comprising: a substrate; a plurality of first display signal lines and a plurality of second display signal lines on the substrate, wherein, the plurality of first display signal lines extend along a first direction and are sequentially arranged along a second direction different from the first direction, the plurality of second display signal lines extend along the second direction and are sequentially arranged along the first direction, the plurality of second display signal lines and the first display signal line intersect to define a plurality of sub-pixel regions; a touch signal line on the substrate, wherein, the touch signal line extends along the second direction; a first insulating layer and a common electrode on the substrate, wherein, the first insulating layer is located between the touch signal line and the common electrode in a direction perpendicular to the substrate, and the touch signal line is electrically connected to the common electrode through a touch line via hole penetrating the first insulating layer; and a plurality of pixel electrodes on the substrate, wherein, the plurality of pixel electrodes are respectively located in the plurality of sub-pixel regions, wherein, the plurality of sub-pixel regions comprise a first sub-pixel region, the plurality of pixel electrodes comprise a first pixel electrode, the first pixel electrode is located in the first sub-pixel region, and the first pixel electrode comprises a first edge and a second edge arranged along the first direction and extending along the second direction, an orthogonal projection of the touch signal line on the substrate is located between orthogonal projections of the first edge and the second edge on the substrate; the array substrate comprises a pixel electrode layer on the substrate, the pixel electrode layer comprises the plurality of pixel electrodes and comprises an etching stop part insulated from the plurality of pixel electrodes, the etching stop part is located in the touch line via hole, and the common electrode is electrically connected to the touch signal line through the etching stop part.

In the array substrate provided by at least embodiment of the present disclosure, the first insulating layer comprises a first sub-insulating layer, an organic insulating layer and a second sub-insulating layer sequentially located on the substrate, and the first sub-insulating layer is located between the organic insulating layer and the substrate in a direction perpendicular to the substrate; the touch line via hole comprises a first sub-insulating layer via hole in the first sub-insulating layer, an organic insulating layer via hole in the organic insulating layer and a second sub-insulating layer via hole in the second sub-insulating layer, the first sub-insulating layer via hole, the organic insulating layer via hole and the second sub-insulating layer via hole are connected to each other, and the etching stop part at least covers a sidewall of the first sub-insulating layer via hole.

In the array substrate provided by at least embodiment of the present disclosure, adjacent edges of the first sub-insulating layer via hole and the organic insulating layer via hole are aligned with each other.

In the array substrate provided by at least embodiment of the present disclosure, an orthogonal projection of the organic insulating layer on the substrate comprises a portion extending into an orthogonal projection of the second sub-insulating layer via hole on the substrate.

In the array substrate provided by at least embodiment of the present disclosure, further comprising: a connector and a second insulating layer on the substrate, wherein, the second insulating layer is located on a side of the touch signal line facing the substrate, and the first insulating layer is located on a side of the touch signal line away from the substrate; the connector is located on a side of the second insulating layer facing the substrate, and the connector is electrically connected to the common electrode through a connector via hole penetrating through the second insulating layer and the first insulating layer.

In the array substrate provided by at least embodiment of the present disclosure, the connector via hole comprises a first sub-via hole in the second insulating layer, a second sub-via hole in the first sub-insulating layer, a third sub-via hole in the organic insulating layer and a fourth sub-via hole in the second sub-insulating layer, the first sub-via hole, the second sub-via hole, the third sub-via hole and the fourth sub-via hole are connected to each other.

At least one embodiment of the present disclosure provides a touch display device, comprising: the array substrate according to any one of above embodiments.

In the touch display device providing by at least one embodiment, further comprising a black matrix layer, wherein, a portion of the first sub-pixel region surrounded by the black matrix layer is an opening region, and an orthogonal projection of the touch signal line on the first sub-pixel region passes through the opening region.

BRIEF DESCRIPTION OF THE DRAWINGS

In order to more clearly illustrate the technical schemes of the embodiments of the present disclosure, the accompanying drawings of the embodiments will be briefly introduced as below. It is obvious that the accompanying drawings in the following description merely relate to some embodiments of the present disclosure, and are not intended to limit the present disclosure.

DETAILED DESCRIPTION

In order to make the purpose, technical scheme and advantages of the embodiments of the present disclosure clearer, the technical schemes of the embodiments of the present disclosure will be clearly and completely described below in combination with the accompanying drawings of the embodiments of the present disclosure. Obviously, the described embodiments are a part of the embodiments of the present disclosure, instead of all of the embodiments. All other embodiments obtained by those skilled in the art based on the described embodiments of the present disclosure without creative work are belonging to the protection scope of the present disclosure.

Unless otherwise defined, the technical terms or scientific terms used in the present disclosure should have the general meaning that is understood by those with general skills in the art to which the present disclosure belongs. The terms "first", "second" and the like used in the present disclosure do not represent any order, quantity or importance, but are merely used to distinguish different components. The term such as "including" or "comprising" or the like indicate that the elements or objects appearing therebefore include the elements or objects listed thereafter and their equivalents, but do not exclude other elements or objects. The terms, such as "connection" or "connected to each other" or the like do not limit that the connection is a physical or mechanical connection, but may include electrical connection, whether direct or indirect. The terms "on", "below", "left", "right" and the like are merely used to represent the relative positional relationship, and when the absolute position of the described object changes, the relative position relationship may also change accordingly.

Figure 1A:
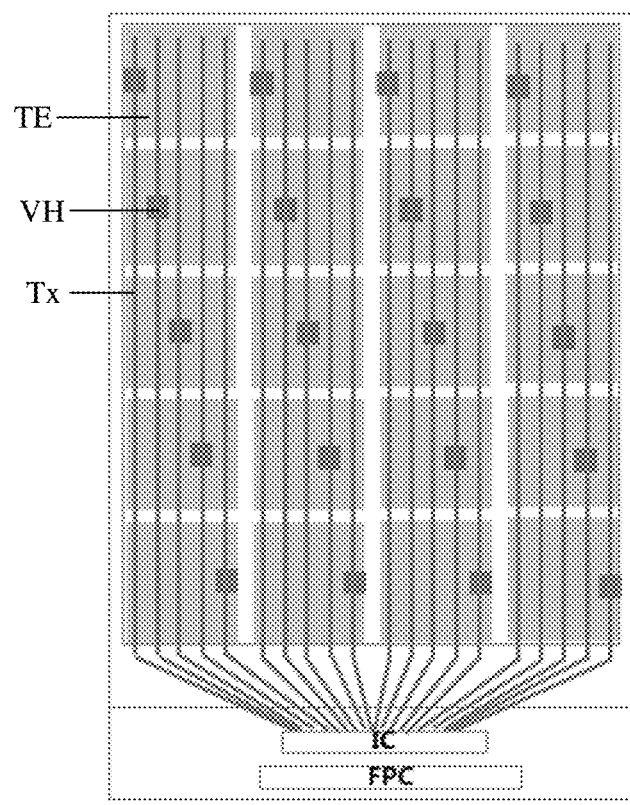
FIG. 1A is a schematic view of an in-cell touch screen.
Figure 1B:
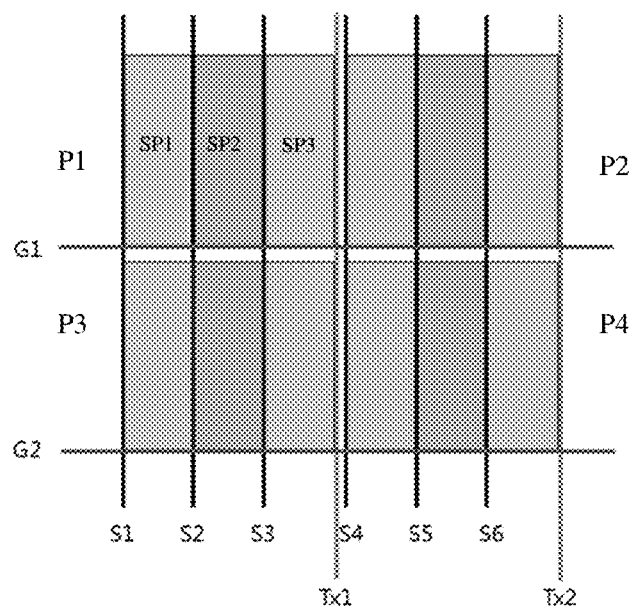
FIG. 1B is a schematic view illustrating a positional relationship between touch signal lines and sub-pixel regions in the in-cell touch screen shown in FIG. 1A.

FIG. 1A is a schematic view of an in-cell touch screen, and FIG. 1B is a schematic view illustrating a positional relationship between touch signal lines and sub-pixel regions in the in-cell touch screen shown in FIG. 1A. As shown in FIG. 1A, the in-cell touch screen includes a plurality of touch electrodes TE and a plurality of touch signal lines Tx arranged in an array, each touch electrode TE is electrically connected to the corresponding touch signal line Tx through a via hole VH, so as to be electrically connected to a touch control circuit IC through the touch signal line Tx. As shown in FIG. 1B, the in-cell touch screen includes a plurality of pixel regions P (FIG. 1B illustrate four pixel regions P1, P2, P3 and P4 as an example), and each pixel region P includes three sub-pixel regions (see SP1, SP2 and SP3), each sub-pixel region is defined by adjacent gate lines G (FIG. 1B illustrates two gate lines G1 and G2 as an example) and adjacent data lines S (FIG. 1B illustrates date lines S1 to S6 as an example) that intersect each other. Each touch signal line Tx is located between two columns of the pixel regions P that are adjacent in the extending direction of the gate lines G.

The inventors of the present application noted in the research that, when the in-cell touch screen shown in FIG. 1A is applied to liquid crystal display device, the touch signal line Tx is easy to cause color deviation of the liquid crystal display device.

Figure 2:
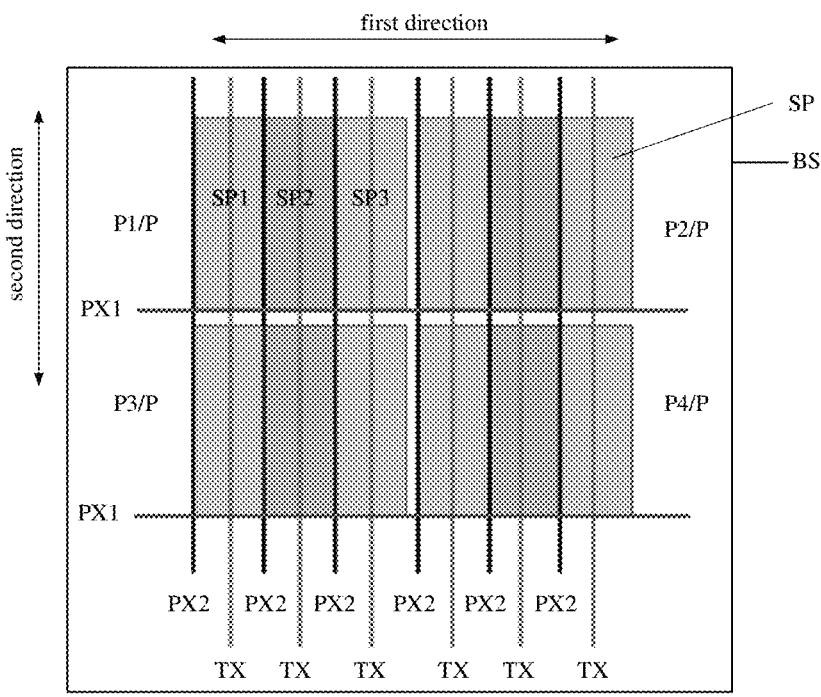
FIG. 2 is a schematic view illustrating a positional relationship between touch signal lines and sub-pixel regions in an array substrate provided by the embodiments of the present disclosure.

FIG. 2 is a schematic view illustrating a positional relationship between touch signal lines and sub-pixel regions in an array substrate provided by the embodiments of the present disclosure. As shown in FIG. 2, the embodiments of the present disclosure provide an array substrate including a substrate BS, and a plurality of first display signal lines PX1 and a plurality of second display signal lines PX2 located on the substrate BS. The plurality of first display signal lines PX1 extend along a first direction and are sequentially arranged along a second direction different from the first direction; the plurality of second display signal lines PX2 extend along the second direction and are sequentially arranged along the first direction. One of the first display signal line PX1 and the second display signal line PX2 is a gate line and the other one is a data line; the second display signal line PX2 and the first display signal line PX1 are crossed to define a plurality of sub-pixel regions SP, and the plurality of sub-pixel regions SP respectively belong to a plurality of pixel regions P (FIG. 2 illustrates four pixel regions P1, P2, P3 and P4 as example), that is, each pixel region P includes a plurality of sub-pixel regions SP. For example, each pixel region P includes three sub-pixel regions SP1, SP2, and SP3. Each sub-pixel region SP includes a first region and a second region surrounding the first region (the first region and the second region are not shown in FIG. 2); when the array substrate is used for a display device, the first region of the sub-pixel region is an opening region which is not masked by a black matrix layer in the display device, and the second region of the sub-pixel region is a non-opening region masked by the black matrix layer.

As shown in FIG. 2, the array substrate further includes a plurality of touch signal lines TX located on the substrate BS, the plurality of signal lines TX extend along the second direction and are sequentially arranged along the first direction; and each touch signal line TX passes through the first regions of the sub-pixel regions SP. In the embodiments of the present disclosure, through making the touch signal line TX pass through the first regions of the sub-pixel regions, for example, making a same touch signal line TX pass through the first regions of the sub-pixel regions located in a same column, color deviation may be avoided when the in-cell touch screen shown in FIG. 1A and FIG. 1B is applied to a liquid crystal display device.

The array substrate further includes a plurality of pixel electrodes (not shown in FIG. 2) located on the substrate, the plurality of pixel electrodes are respectively located in the above-described plurality of sub-pixel regions SP, for example, each pixel electrode is located in one sub-pixel region; each pixel electrode includes a first edge and a second edge arranged along the first direction and extending in the second direction, the first edge and the second edge are the edges of the pixel electrode that are farthest away from each other in the first direction, and the first edge and the second edge are located in the first region of the sub-pixel region where the pixel electrode is located. In view of this, the touch signal line TX passing through the first region of the sub-pixel region refers to that a portion of the orthogonal projection of the touch signal line TX on the substrate BS within the sub-pixel region is located between the orthogonal projections of the first edge and the second edge included in the pixel electrode in the sub-pixel region on the substrate.

The inventors of the present application further noted that, when the in-cell touch screen shown in FIG. 1A and FIG. 1B is applied to medium and large size touch products, the number of touch electrodes TE is large, however, more touch signal lines TX cannot be arranged within the touch electrode TE with a fixed area, therefore, the numbers of the touch signal lines TX and the touch electrodes TE cannot be matched. For example, for a common mobile HD product, the area of the pixel region is about 100*100 μm, the area of the touch electrode is about 4*4 mm, so each touch electrode corresponds to 40*40 pixel regions, that is, forty touch signal lines may be arranged within each touch electrode according to the wiring mode shown in FIG. 1A and FIG. 1B; however, when the size of the touch product is large, and the number of touch electrodes in one column is greater than 40, the number of touch signal lines that can be arranged in each touch electrode cannot meet the number of touch signal lines required by the column of touch electrodes.

In order to match the number of touch signal lines with the number of touch electrodes, in at least one embodiment, as shown in FIG. 2, the first regions of each column of sub-pixel regions SP are passed by one touch signal line TX. Compared to the wiring mode in which each touch signal line TX is located between two adjacent columns of pixel regions P shown in FIG. 1B, in the embodiments of the present disclosure, the first regions of each column of sub-pixel regions SP included in each column of pixel regions P are passed by one touch signal line TX, which may greatly increase the number of touch signal lines TX, and avoid the situation in which the number of touch signal lines TX cannot meet the number of touch electrodes when the size of touch product is large and the number of touch electrodes is large.

On the other hand, since the embodiments of the present disclosure increase the number of touch signal lines TX, each touch electrode may use more touch signal lines TX to supply signals, thereby enhancing the supply of touch signals and avoiding poor touch strips.

On the other hand, since each of the plurality of sub-pixel regions (e.g., three sub-pixel regions) included in the same pixel region corresponds to one touch signal line TX, the parasitic capacitance/storage capacitance ratio Cpd/CST of these sub-pixel regions has good uniformity, such that the phenomenon of uneven picture color may be avoided.

On the other hand, the inventors of the present application noted that, when the size of touch product is large and the in-cell touch screen as shown in FIG. 1A and FIG. 1B is adopted, the touch signal transmitted from the output end of the touch control circuit IC to a far end of the touch product screen would experience RC delay, which results in the attenuation of the touch signal, that is, the signal of the touch electrode at the far end of the screen is weaker than the signal of the touch electrode at the near end of the screen (the near end of the screen is closer to the IC than the far end of the screen), resulting in display difference (e.g. poor touch strips) between the far end of the screen and the near end of the screen; in the embodiments of the present disclosure, the number of touch signal lines TX is large, for example, a single touch electrode may use multiple touch signal lines TX to supply signals at the same time, which represents that the overall resistance R of the touch signal lines electrically connected to the touch electrode is reduced, and therefore, the signal attenuation of the touch electrode becomes smaller, so as to reduce the display difference between the far end of the screen and the near end of the screen.

In at least another embodiment, the first regions of a portion of the plurality of sub-pixel regions included in the array substrate may be passed by the touch signal line, respectively, and the first regions of another portion of the plurality of sub-pixel regions may not be passed by the touch signal line.

For ease of description, hereinafter, the sub-pixel region with the first region passed by the touch signal line is referred to as a first sub-pixel region, and the pixel electrode located within the first sub-pixel region is referred to as a first pixel electrode, the sub-pixel region with the first region not passed by the touch signal line is referred to as a second sub-pixel region, and the pixel electrode located within the second sub-pixel region is referred to as a second pixel electrode. Therefore, the above-described "the first regions of each column of sub-pixel regions SP are passed by one touch signal line TX" refers to that, there is an orthogonal projection of one touch signal line TX on the substrate located between the orthogonal projections of the first edge and the second edge (included in the first pixel electrode within the first sub-pixel region of each column of sub-pixel regions) on the substrate.

In at least one embodiment, the array substrate includes a first electrode located on the substrate BS, the first electrode includes a plurality of strip electrodes extending along the second direction; in the first sub-pixel region, the orthogonal projection of the touch signal line on the substrate BS is at least partially located between the orthogonal projections of adjacent strip electrodes in the first direction on the substrate BS. Through disposing the touch signal line between the adjacent strip electrodes, the overlap between the touch signal line and the strip electrodes adjacent thereto may be avoided as far as possible, so as to reduce the capacitance between the touch signal line and the first electrode. The first electrode may be a common electrode or a pixel electrode.

In at least one embodiment, the array substrate further includes a second electrode located on the substrate, and the second electrode is located between the first electrode and the substrate in a direction perpendicular to the substrate (a direction perpendicular to the main surface of the substrate). In the case that the first electrode is a common electrode, the second electrode is a pixel electrode; in the case that the first electrode is a pixel electrode, the second electrode is a common electrode. When the array substrate is applied in a liquid crystal display device for display, a pixel voltage is applied to the pixel electrode, and a common voltage is applied to the common electrode, such that an electric field for controlling the deflection of liquid crystal in the liquid crystal display device is generated between the pixel electrode and the common electrode to realize the display function.

In at least one embodiment, the first electrode is a common electrode and is electrically connected to the touch signal line, that is to say, the common electrode is multi-used as a touch electrode. In this case, when the array substrate is applied to a liquid crystal display device, for example, adopting a time-sharing driving mode, that is, during the display stage, a common voltage is applied to the common electrode to realize the display function; during the touch stage, a touch signal is applied to the common electrode to realize the touch function.

For example, the array substrate provided by the embodiments of the present disclosure may adopt self-capacitance principle. Taking the common electrode multi-used as a touch electrode for example, the common electrode layer includes a plurality of common electrodes electrically insulated from each other, the plurality of common electrodes are, for example, arranged in a plurality of rows and a plurality of columns, each common electrode serves as a self-capacitive touch electrode, and there are multiple rows and multiple columns of sub-pixel regions in the region where each common electrode is located.

In at least one embodiment, the array substrate further includes a plurality of switch elements located on the substrate, the plurality of switch elements are respectively located in the plurality of sub-pixel regions included in the array substrate, and are electrically connected to the pixel electrodes in these sub-pixel regions, respectively, and the switch elements are located at the cross positions of the first display signal lines and the second display signal lines. Hereinafter, the switch element located in the first sub-pixel region is referred to as a first switch element. In order to avoid the overlap of the touch signal line and the first switch element to reduce the parasitic capacitance, in at least one embodiment, the touch signal line has a bending part at the position near the first switch element, so as to bypass the switch element, and the bending part is located between the adjacent switch elements in the first direction. In order to avoid the overlap of the touch signal line and the first switch element, in at least one embodiment, in the first region of the first sub-pixel region, the distances between the touch signal line and the two second display signal lines adjacent thereto may not be equal, and the first switch element in the first sub-pixel region is located between the touch signal line and the second display signal line with a larger distance from the touch signal line and adjacent to the touch signal line.

The array substrate provided by the embodiments of the present disclosure will be described in detail below, taking the first electrode being a common electrode including a plurality of strip electrodes and the second electrode being a pixel electrode as an example.

Figure 3:
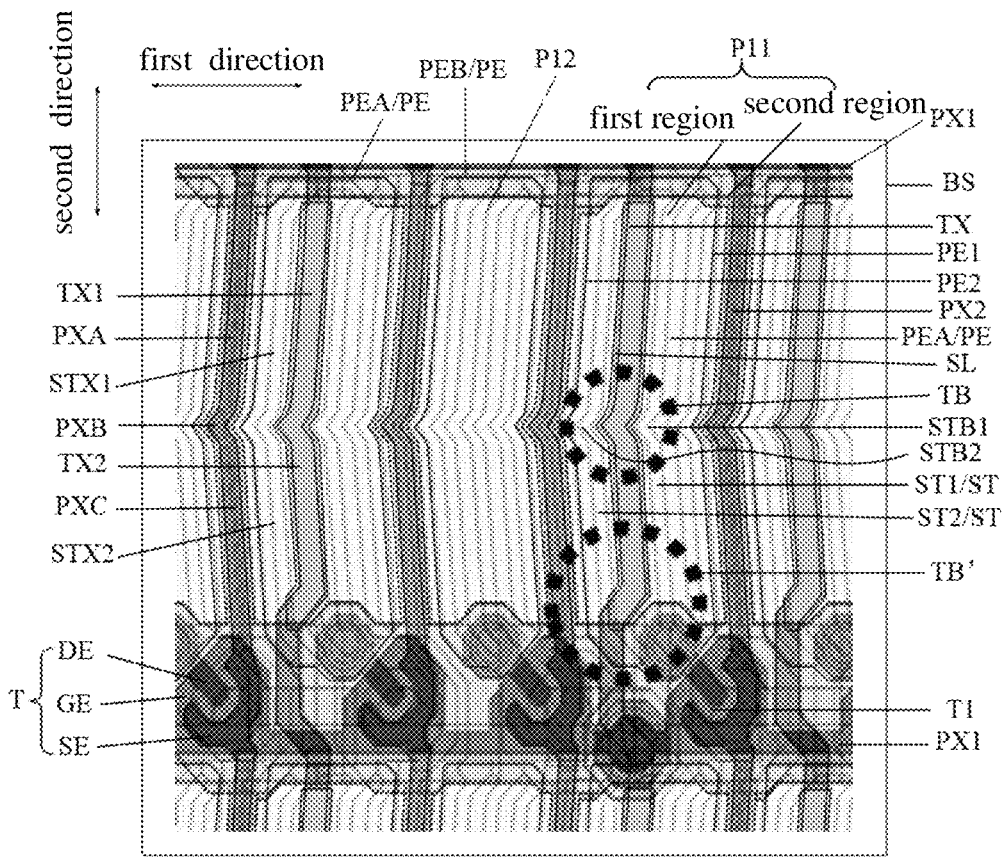
FIG. 3 is a first schematic top view of an array substrate provided by the embodiments of the present disclosure.
Figure 4A:
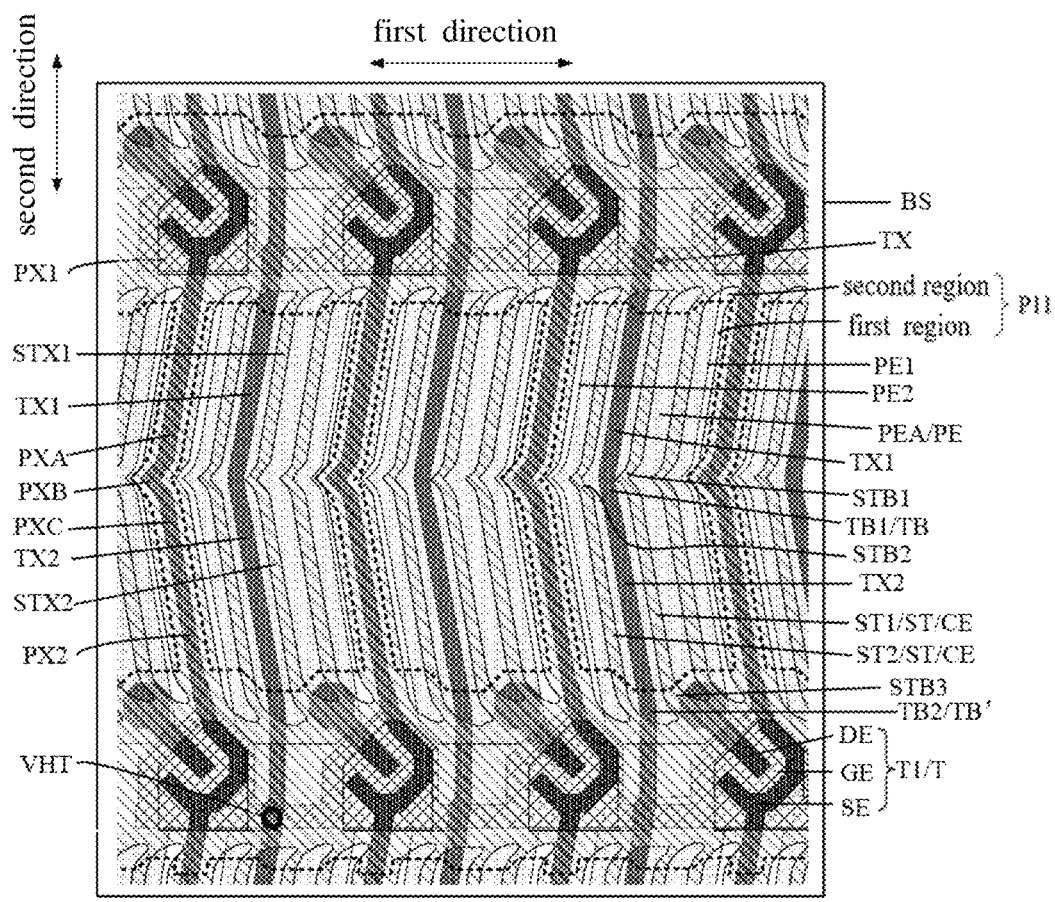
FIG. 4A is a second schematic top view of an array substrate provided by the embodiments of the present disclosure.
Figure 4B:
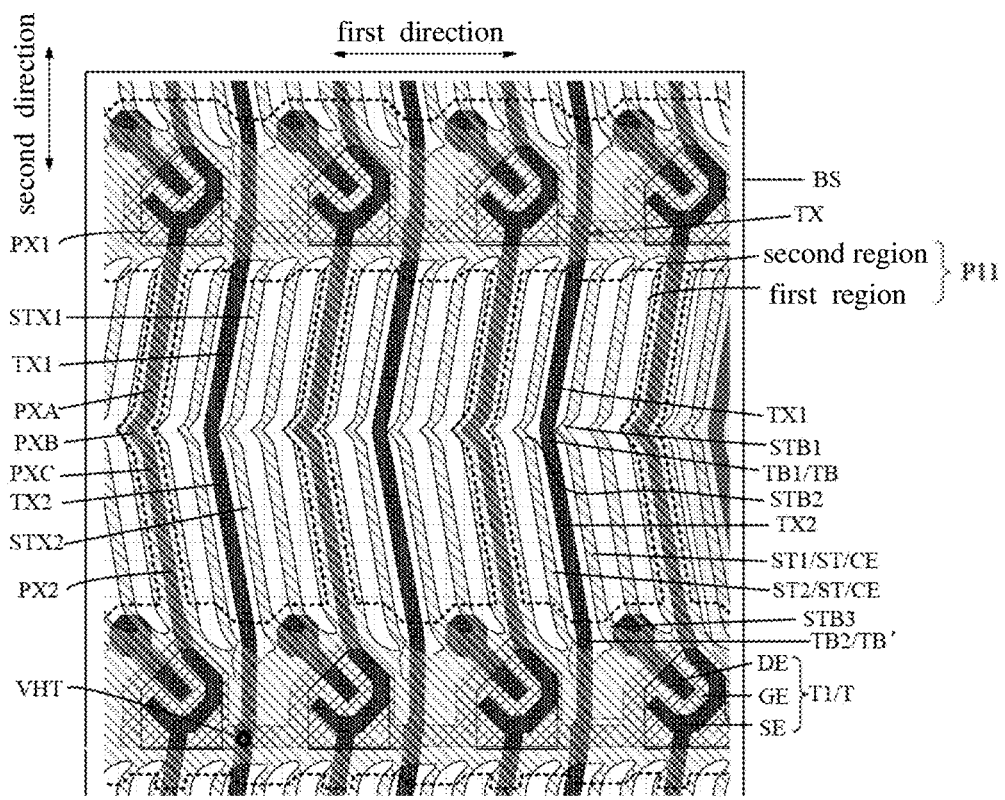
FIG. 4B to FIG. 4D are schematic top views of partial structures in the array substrate shown in FIG. 4A.
Figure 4C:
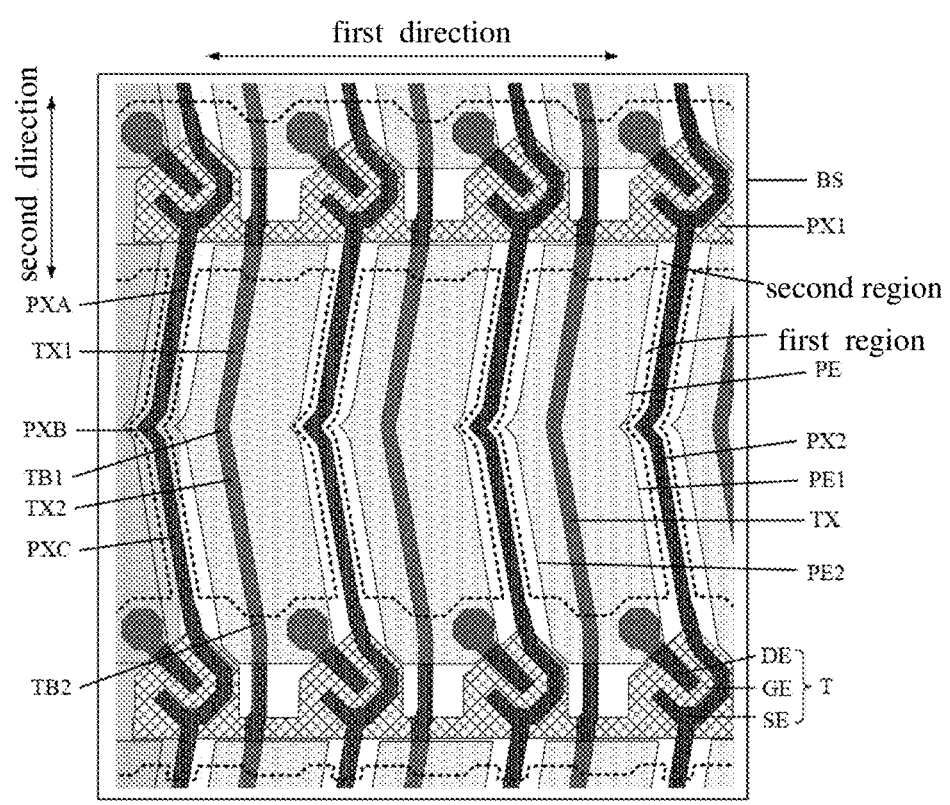
Figure 4D:
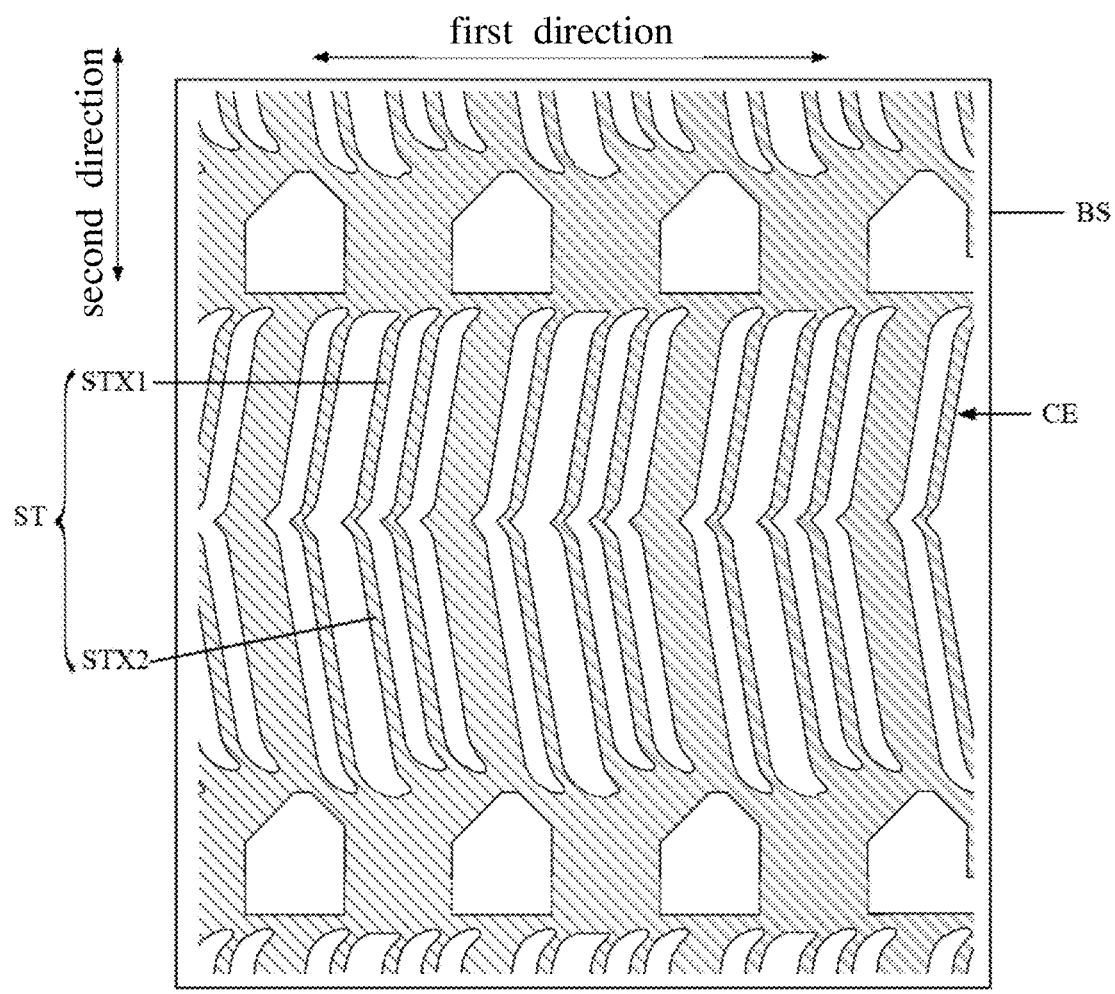
Figures 5A, 5B:
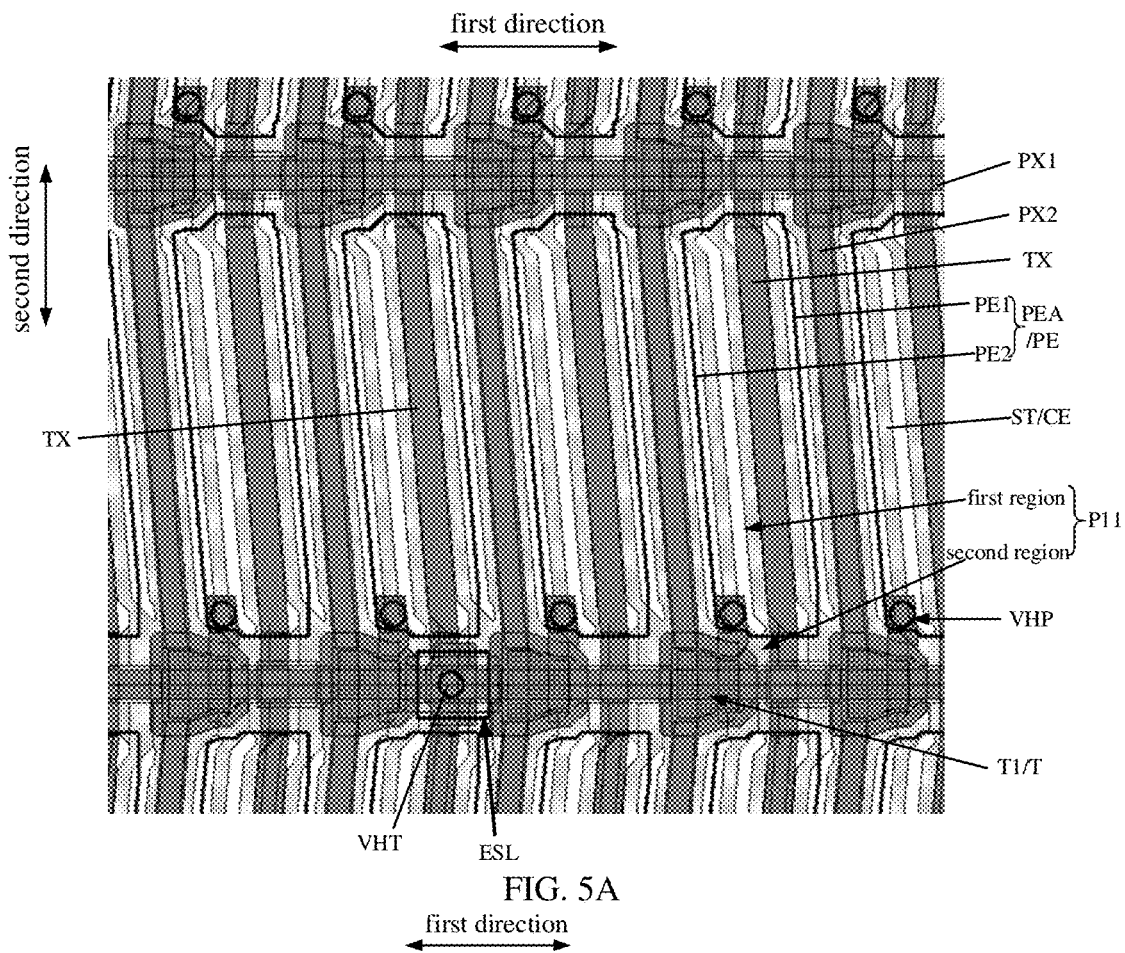
FIG. 5A is a third schematic top view of an array substrate provided by the embodiments of the present disclosure.
FIG. 5B is a schematic top view of a partial structure in the array substrate shown in FIG. 5A.

FIG. 3 is a first schematic top view of an array substrate provided by the embodiments of the present disclosure; FIG. 4A is a second schematic top view of the array substrate provided by the embodiments of the present disclosure; FIG. 4B to FIG. 4D are schematic top views illustrating partial structures in the array substrate shown in FIG. 4A; FIG. 5A is a third schematic top view of the array substrate provided by the embodiments of the present disclosure; FIG. 5B is a schematic top view illustrating a partial structure in the array substrate.

As shown in FIGS. 3-4C and FIGS. 5A-5B, the array substrate provided by the embodiments of the present disclosure includes a substrate BS, and includes a plurality of first display signal lines PX1, a plurality of second display signal lines PX2 and a plurality of touch signal lines TX located on the substrate BS. The first display signal lines PX1 extend along the first direction, the second display signal lines PX2 extend along the second direction, and the regions defined by the crossed adjacent first display signal line PX1 and adjacent second display signal line PX2 are sub-pixel regions. The sub-pixel region includes a first region (as shown by the region surrounded by each dotted box) and a second region surrounding the first region. Both the first display signal line PX1 and the second display signal line PX2 are located in the second region. The touch signal lines TX extend along the second direction, and the touch signal line TX passes through the first region of the sub-pixel region in which the touch signal line TX is located.

In at least one embodiment, as shown in FIGS. 3-4C and FIGS. 5A-5B, at the position where the touch signal line TX and the first display signal line PX1 intersect, the first display signal line PX1 has a recess, so as to reduce the overlapping area between the first display signal line PX1 and the touch signal line TX, thereby reducing the parasitic capacitance.

In at least one embodiment, as shown in FIG. 3, the plurality of sub-pixel regions included in the array substrate include a first sub-pixel region P11 and a second sub-pixel region P12, the first region of the first sub-pixel region P11 is passed by the touch signal line TX, and the first region of the second sub-pixel region P12 is not passed by the touch signal line TX. In some other embodiments, as shown in FIG. 4A and FIG. 5A, the first region of each sub-pixel region is passed by one touch signal line TX, that is to say, the plurality of sub-pixel regions included in the array substrate merely include the first sub-pixel regions P11 and do not include the second sub-pixel region P12. In this case, there is only one touch signal line TX between every two adjacent second display signal lines PX2, and there is only one second display signal line PX2 between every two adjacent touch signal lines TX. As described above, through making the first region of each sub-pixel region be passed by only one touch signal line TX, the situation that the number of touch signal lines TX cannot meet the number of touch electrodes when the number of touch electrodes is large may be avoided, and poor touch strips may be avoided, the phenomenon of uneven picture color may be avoided, and the display difference between the far end of the screen and the near end of the screen may be reduced.

As shown in FIG. 3 to FIG. 5B, the array substrate further includes a plurality of pixel electrodes PE located on the substrate BS, each pixel electrode PE is located in a sub-pixel region, and each pixel electrode PE includes a first edge PE1 and a second edge PE2 arranged along the first direction and extending along the second direction. The first edge PE1 and the second edge PE2 are the two edges of the pixel electrode PE that are farthest away from each other in the first direction. For example, both the first edge PE1 and the second edge PE2 include two ends arranged along the second direction and a body part located between the two ends, both the two ends are located in the second region of the sub-pixel region, and the body part is located in the first region.

In some embodiments, as shown in FIGS. 3-4A, FIG. 4C and FIGS. 5A-5B, both the edges PE1 and PE2 of each pixel electrode PE farthest away from and opposite to each other in the first direction are located in the first region. In view of this, the first region of the first sub-pixel region P11 being passed by the touch signal line TX indicates that, within the first sub-pixel region P11, the orthogonal projection of the touch signal line TX on the substrate BS is located between the orthogonal projections of the first edge PE1 and the second edge PE2 included in the first pixel electrode PEA on the substrate BS. Since the size of the first region in the second direction is larger than the size of the second region in the second direction, in the second direction, the size of the portion of the touch signal line located in the first region is larger than of the size of the portion of the touch signal line located in the second region.

In at least one embodiment, as shown in FIG. 3, the first pixel electrode PEA in the first sub-pixel region P11 has an opening SL extending in the second direction between the first edge PE1 and the second edge PE2, and the orthogonal projection of the touch signal line TX on the substrate BS is located between the orthogonal projections of opposite edges in the first direction included in the opening SL on the substrate BS, as such, the touch signal line TX and the first pixel electrode PEA do not overlap at the position of the opening SL of the first pixel electrode PEA, such that the capacitance between the touch signal line TX and the first pixel electrode PEA may be reduced. As shown in FIG. 3, since the first region of the second sub-pixel region P12 is not passed by the touch signal line TX, that is, the second pixel electrode PEB in the second sub-pixel region P12 is not overlapped with the touch signal line TX, in this case, the second pixel electrode PEB in the second sub-pixel region is a continuous structure without an opening between its two farthest edges in the first direction (i.e., the first edge PE1 and the second edge PE2), that is, the second pixel electrode PEB is a plate structure.

In at least one embodiment, as shown in FIG. 3, in the case that the first pixel electrode PEA in the first sub-pixel region P11 has an opening SL corresponding to the touch signal line TX and the second pixel electrode PEB in the second sub-pixel region P12 does not have an opening, in order to reduce the difference between the pixel capacitances of the first sub-pixel region P11 and the second sub-pixel region P12, the size of the first pixel electrode PEA in the first direction is greater than the size of the second pixel electrode PEB in the second direction, that is, the distance between the first edge PE1 and the second edge PE2 of the first pixel electrode PEA is greater than the distance between the first edge PE1 and the second edge PE2 of the second pixel electrode PEB.

In at least another embodiment, as shown in FIG. 4A, FIG. 4C and FIGS. 5A-5B, since the first region of each sub-pixel region is passed by the touch signal line TX, the pixel electrode PE in each sub-pixel region is a continuous structure without an opening between the first edge PE1 and the second edge PE2 (that is, each pixel electrode PE is a plate structure).

In at least another embodiment, in the case that the first region of each sub-pixel region is passed by the touch signal line TX, the pixel electrode PE in each sub-pixel region has an opening extending along the second direction between the first edge PE1 and the second edge PE2, and the orthogonal projection of the touch signal line TX in the sub-pixel region on the substrate BS is located between the orthogonal projections of opposite edges in the first direction included in the opening on the substrate BS, so as to reduce the capacitance between the touch signal line TX and the pixel electrode PE.

As shown in FIGS. 3-4C and FIGS. 5A-5B, the array substrate further includes a plurality of switch elements T located on the substrate BS, the plurality of switch elements T are respectively located in the plurality of sub-pixel regions included in the array substrate. For example, the plurality of switch elements T are one-to-one corresponding to the plurality of sub-pixel regions. Each touch signal line TX is a curved structure having a bending part in the first sub-pixel region P11, so as to bypass the first switch element T1 in the first sub-pixel region P11 through the bending part.

In order to avoid the touch signal line TX from being overlapped with the first switch element T1, in at least one embodiment, the touch signal line TX is located between two switch elements T that are adjacent in the first direction.

In order to avoid the touch signal line TX from being overlapped with the first switch element T1, in at least one embodiment, in the first region of the first sub-pixel region P11, the distances between the orthogonal projection of the touch signal line TX on the substrate BS and the two second display signal lines PX2 adjacent to the touch signal line TX are not equal, the first switch element T1 included in the first sub-pixel region P11 is located between the touch signal line TX and the second display signal line PX2 of the adjacent two second display signal lines PX2 which is farther from the touch signal line TX.

As shown in FIGS. 3-4B and FIG. 5A, the array substrate further includes a plurality of strip electrodes ST located on the substrate BS, the plurality of strip electrodes ST extend along the second direction; in the first sub-pixel region P11, the orthogonal projection of the touch signal line TX on the substrate BS is at least partially located between the orthogonal projections of adjacent strip electrodes ST in the first direction on the substrate BS. For example, in the first region of the first sub-pixel region P11, the touch signal line TX and the strip electrode ST adjacent thereto are not overlapped with each other; in the second region of the first sub-pixel region P11, the touch signal line TX is not overlapped or merely partially overlapped with the strip electrodes ST adjacent thereto. For example, the above-described plurality of strip electrodes ST included in the array substrate belong to a common electrode CE. In some other embodiments, it may also be that the pixel electrode PE includes the above-described plurality of strip electrodes ST.

Figure 6A:
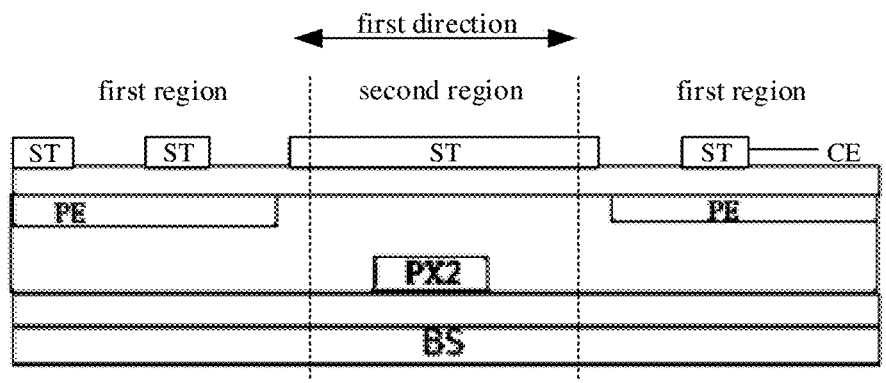
FIG. 6A is a schematic view illustrating a positional relationship between a second display signal line and a strip electrode in an array substrate provided by the embodiments of the present disclosure.
Figure 6B:
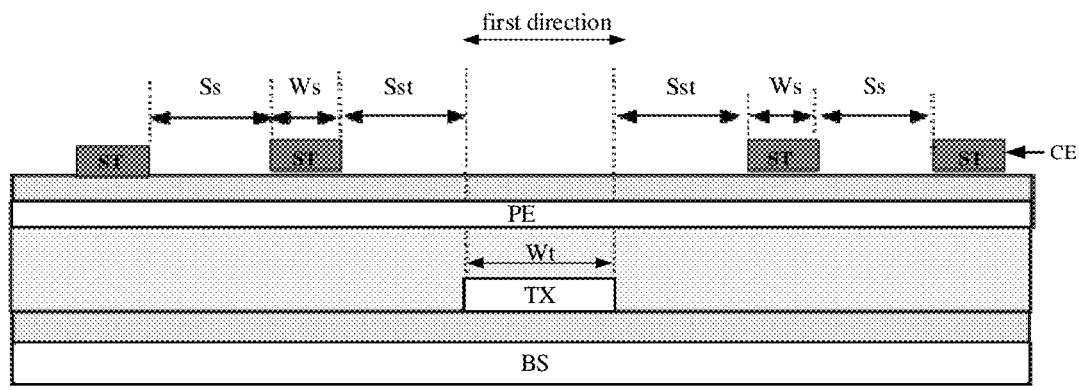
FIG. 6B is a schematic view illustrating a positional relationship between touch signal lines and strip electrodes in an array substrate provided by the embodiments of the present disclosure.

FIG. 6A is a schematic view illustrating a positional relationship between the second display signal line and the strip electrodes in the array substrate provided by the embodiments of the present disclosure; FIG. 6B is a schematic view illustrating a positional relationship between the touch signal line and the strip electrodes in the array substrate provided by the embodiments of the present disclosure.

As shown in FIG. 6A and FIG. 6B, the common electrode CE includes a plurality of strip electrodes ST, and the pixel electrode PE is located between the substrate BS and the common electrode CE in a direction perpendicular to the substrate BS.

In at least one embodiment, as shown in FIGS. 4A-4B, FIG. 5A and FIG. 6A, the orthogonal projection of each second display signal line PX2 on the substrate BS is overlapped with the orthogonal projection of one strip electrode ST on the substrate BS, which is advantageous to prevent light leakage.

In at least one embodiment, as shown in FIGS. 4A-4B, FIG. 5A and FIG. 6A, the size in the first direction of the strip electrode ST overlapped with the second display signal line PX2 is larger than the size in the first direction of the strip electrode ST adjacent to and not overlapped with the second display signal line PX2. Crosstalk may be prevented through making the strip electrode ST overlapped with the second display signal line PX2 has a larger width.

In at least one embodiment, as shown in FIGS. 4A-4B, FIG. 5A and FIG. 6A, the edges arranged in the first direction included in the strip electrode ST that is overlapped with the second display signal line PX2 are located in the first region of the sub-pixel region, such that when the array substrate is applied to a display device, the strip electrode ST overlapped with the second display signal line PX2 extend beyond the masking region of the black matrix layer, which is advantageous to improve the transmittance.

In at least one embodiment, as shown in FIGS. 4A-4B and FIG. 5A, the orthogonal projections of the edges included in the portion of the second display signal line PX2 overlapped with the strip electrode ST on the substrate is substantially parallel to the orthogonal projections of the edges of the strip electrode ST on the substrate.

In at least one embodiment, as shown in FIG. 6B, the touch signal line TX includes a portion that is not overlapped with the strip electrode ST; in the first direction, the adjacent strip electrodes ST located on the same side of the portion of the tough signal line TX have a spacing Ss and widths Ws, and the spacing between the portion of the touch signal line TX and the strip electrode ST adjacent thereto is Sst. In at least one embodiment, the range of Ws/Ss is 45%-80%, if it exceeds this range, the fluctuation of transmittance is large and defect is easy to occur. In at least one embodiment, the distance Sst between the strip electrode ST adjacent to the touch signal line TX and the touch signal line TX ranges from 1.7 µm to 3.0 µm. If Sst is too large, the transmittance loss is large. If Sst is too small, the touch signal line TX and the strip electrode ST are easy to overlap. In at least one embodiment, the width Wt of the touch signal line TX in the first direction ranges from 2 µm to 3.5 µm, such as, 3.1 µm or 3.5 µm, etc. If the width of the touch signal line TX is too small, the touch signal line TX is easy to break. The larger the width of the touch signal line TX is, the more the transmittance loss is. For example, the width Wt of the touch signal line TX is about 3.5 µm, the width Ws of the strip electrode ST is about 2.6 µm, the spacing Ss between the strip electrodes ST is about 4.5 µm, the distance Sst between the strip electrode ST adjacent to the touch signal line Tx and the touch signal line TX is about 1.85 µm.

In at least one embodiment, the plurality of strip electrodes ST in the same sub-pixel region may have a multi-domain structure (as shown in FIGS. 3-4B and FIG. 4D) or a single-domain structure (as shown in FIG. 5A).

As shown in FIGS. 3-4B and FIG. 4D, each strip electrode ST has two ends arranged along the second direction and includes a body part located between the two ends, the body part of the strip electrode ST is located in the first region of the sub-pixel region, and the body part of the strip electrode ST includes a first linear part STX1 and a second linear part STX2 sequentially arranged along the second direction, the extending directions of the first linear part STX1 and the second linear part STX2 intersect. For example, the first linear parts STX1 included in the body parts of the strip electrodes ST in the same sub-pixel region are substantially parallel to each other, and the second linear parts STX2 included in the body parts of the strip electrodes ST in the sub-pixel region are substantially parallel to each other, such that the strip electrodes ST in the sub-pixel region have a double-domain structure.

As shown in FIG. 5A, the body parts of the strip electrodes ST in a same sub-pixel region are substantially linear, and the strip electrodes ST in the same sub-pixel region P11 are parallel to each other, such that the strip electrodes in the sub-pixel region have a single domain structure.

The embodiments of the present disclosure are described taken the single-domain structure and double-domain structure as examples; In some other embodiments, the strip electrodes ST in the same sub-pixel region may also have a domain structure of three domains or more than three domains.

In at least one embodiment, the domain structures of the strip electrodes in the sub-pixel regions that are adjacent in the second direction may be the same. For example, in terms of a first row of sub-pixel regions and a second row of sub-pixel regions that are adjacent in the second direction (the row direction is along the first direction), a portion of the strip electrodes in the first row of sub-pixel regions and adjacent to the second row of sub-pixel regions has an extending direction different from an extending direction of a portion of the strip electrodes in the second row of sub-pixel regions and adjacent to the first row of sub-pixel regions. In some other embodiments, the domain structures of the strip electrodes in the sub-pixel regions that are adjacent in the second direction may also be different.

As shown in FIG. 3 and FIG. 4A, since the first strip electrode linear part STX1 and the second strip electrode linear part STX2 of the strip electrode ST intersect, the strip electrode ST has a first strip electrode bending part STB1 at the position where the first strip electrode linear part STX1 and the second strip electrode linear part STX2 intersect.

In at least one embodiment, as shown in FIG. 3 and FIG. 4A, the plurality of strip electrodes ST in the array substrate includes first strip electrodes ST1 adjacent to the touch signal lines TX, and the touch signal line TX also has a bending part (hereinafter referred to as a touch line bending part TB) at the position adjacent to the first strip electrode bending part STB1 included in the first strip electrode ST1, so as to avoid the touch signal line TX from being overlapped with the strip electrode ST in the first region of the first sub-pixel region P11 as far as possible. For example, in the first region, the touch signal line TX includes a first touch line linear part TX1 and a second touch line linear part TX2 that are sequentially arranged along the second direction and connected (e.g., directly connected) to the touch line bending part TB, the touch line bending part TB is located between the first touch line linear part TX1 and the second touch line linear part TX2 in the second direction, the first touch line linear part TX1 is substantially parallel to the first strip electrode linear part STX1, and the second touch line linear part TX2 is substantially parallel to the second strip electrode linear part STX2.

In at least one embodiment, as shown in FIG. 3 and FIG. 4A, the second display signal line PX2 also has a bending part (hereinafter referred to as a display line bending part) at the position adjacent to the first strip electrode bending part STB1. The second display signal line PX2 includes a first display line linear part PXA and a second display line linear part PXC sequentially arranged along the second direction, the display line bending part PXB is located between the first display line linear part PXA and the second display line linear part PXC in the second direction, the first display line linear part PXA is substantially parallel to the first strip electrode linear part STX1, and the second display line linear part PXC is substantially parallel to the second strip electrode linear part STX2.

The inventors of the present application found that, in the embodiment illustrated in FIG. 3, the touch line bending part TB of the touch signal line TX has a sharp end, which may result in abnormal liquid crystal orientation at the touch line bending part TB when the array substrate is used in a liquid crystal display device, and further cause dark state light leakage. Based on this discovery, the embodiments of the present disclosure propose an improved scheme for the touch line bending part TB, as shown in FIG. 4A, in terms of the touch signal line TX and the first strip electrode ST1 adjacent to the touch signal line TX located in the first sub-pixel region P11, the first strip electrode ST1 has the first strip electrode bending part STB1 in the first region, and the touch signal line TX has the first touch line bending part TB1 in the first region, the first touch line bending part TB1 and the first strip electrode bending part STB1 are bent toward the same direction in the first region, the orthogonal projection of the first touch line bending part TB1 on the substrate BS and the orthogonal projection of the first strip electrode bending part STB1 on the substrate BS are sequentially arranged in the first direction, and the bending angle of the first touch line bending part TB1 is greater than the bending angle of the first strip electrode bending part STB1. Through making the bending angle of the first touch line bending part TB1 greater than the bending angle of the first strip electrode bending part STB1, the first touch line bending part TB1 is more gentle than the first strip electrode bending part STB1, such that the disorder of liquid crystal orientation at the first touch line bending part TB1 may be avoided, and further avoiding the dark state light leakage at this position.

It should be noted that, the bending angle of the first touch line bending part TB1 being greater than that the bending angle of the first strip electrode bending part STB1, refers to that, the first strip electrode bending part STB1 is located on the first side (see the right side in the figure) of the first touch line bending part TB1, and the first touch line bending part TB1 bends away from the first side (in the figure); the distance between the orthogonal projection of the first touch line bending part TB1 and the orthogonal projection of the first strip electrode bending part STB1 firstly decreases and then increases, that is, the distance between the orthogonal projections of the adjacent edges of the two bending parts on the substrate BS firstly decreases and then increases, such that the distance has a minimum value at the sharp end of the first strip electrode bending part STB1.

In at least one embodiment, the first strip electrode bending part STB1 has a sharp end extending towards the first touch line bending part TB1, and the first touch line bending part TB1 has an arced end extending away from the sharp end. The first touch line bending part TB1 adopts the arced end, which may effectively avoid the dark state light leakage at the first touch line bending part TB1.

In at least one embodiment, the angle range of the first touch line bending part TB1 is 100° to 160°. If the angle of the first touch line bending part TB1 is too large, it is easy to cause the overlap of the touch signal line TX and the strip electrode ST, thus affecting the display effect; if the angle of the first touch line bending part TB1 is too small, it may result in more transmittance loss.

In at least one embodiment, as shown in FIG. 3 and FIG. 4A, the orthogonal projection of the first strip electrode bending part STB1 included in the first strip electrode ST1 on the substrate BS is not overlapped with the orthogonal projection of the first touch line bending part TB1.

For example, as shown in FIG. 3 and FIG. 4A, the plurality of strip electrodes ST located in the first sub-pixel region P11 further includes a second strip electrode ST2 adjacent to the touch signal line TX, the second strip electrode ST2 has a second strip electrode bending part STB2 in the first region, the first strip electrode bending part STB1, the second strip electrode bending part STB2 and the first touch line bending part TB1 located therebetween bend toward the same direction in the first region, the orthogonal projection of the second strip electrode bending part STB2 on the substrate BS and the orthogonal projection of the first touch line bending part TB1 are sequentially arranged in the first direction, and the bending angle of the second strip electrode bending part STB2 is less than the bending angle of the first touch line bending part TB1.

It should be noted that, the bending angle of the second strip electrode bending part STB2 being less than the bending angle of the first touch line bending part TB1 refers to that, the second strip electrode bending part STB2 is located on the second side (see the left side in the figure) of the first touch line bending part TB1, the second side is opposite to the first side, and the first touch line bending part TB1 bend towards the second side; the distance between the orthogonal projection of the second strip electrode bending part STB2 and the orthogonal projection of the first touch line bending part TB1 firstly increases and then decreases, that is to say, the distance between the orthogonal projections of the adjacent edges of the two bending parts on the substrate BS firstly increases and then decreases, such that the distance has a maximum value at the top end of the first touch line bending part TB1.

In at least one embodiment, the second strip electrode bending parts STB2 have sharp ends extending toward a same direction, and the first touch line bending parts TB1 have arced ends bending toward the same direction. The first touch line bending part TB1 adopts the arced end, which may effectively alleviate the dark state light leakage at the first touch line bending part TB1.

As shown in FIG. 3 and FIG. 4A, in order to bypass the first switch element T1 in the first sub-pixel region P11, the touch signal line TX has a bending part (hereinafter referred to as a switch side bending part) TB' adjacent to the first switch element T1, and the switch side bending part TB' is located between the touch line bending part TB and the first switch element T1 included in the first sub-pixel region P11 in the second direction, and the switch side bending part TB' is located between the first switch element T1 and the switch element T adjacent to the first switch element T1 in the first direction.

In the embodiment illustrated in FIG. 3, the switch side bending part TB' included in the touch signal line TX has a sharp end located in the first region of the first sub-pixel region P11. During research, the inventor of the present application found that, in the embodiment illustrated in FIG. 3, a phenomenon of disorder of liquid crystal orientation is existed at the switch side bending part TB' included in the touch signal line TX, which result in dark state light leakage. Based on this discovery, the embodiments of the present disclosure propose an improved scheme for the switch side bending part TB'. As shown in FIG. 4A, the touch signal line TX has a second touch line bending part TB2 in the first sub-pixel region P11, the second touch line bending part TB2 is located between the first touch line bending part TB1 and the first switch element T1 included in the first sub-pixel region P11 in the second direction, and the second touch line bending part TB2 is located between the first switch element T1 and the switch element T adjacent to the first switch element T1 in the first direction, and the bending angle of the second touch line bending part TB2 is larger than the bending angle of the first touch line bending part TB1. That is to say, the included angle between the two linear parts directly connected to the first touch line bending part TB1 included in the touch signal line TX is less than the included angle between the two linear parts directly connected to the second touch line bending part TB2 included in the touch signal line TX, such that the touch signal line TX is more gentle at the second touch line bending part TB2 than at the first touch line bending part TB1.

In at least one embodiment, as shown in FIG. 4A, in the first sub-pixel region P11, the first strip electrode ST1 adjacent to the touch signal line TX has a third strip electrode bending part STB3, the third strip electrode bending part STB3 is located between the first switch element T1 and the second touch line bending part TB2 (i.e., the switch side bending part TB') of the touch signal line TX in the first direction, and the bending direction of the second touch line bending part TB2 is opposite to the bending direction of the third strip electrode bending part STB3.

In at least one embodiment, the angle of the second touch line bending part TB2 is in a range of 165° to 175°. If the angle of the second touch line bending part TB2 is too small, it is easy to cause the distance between the touch signal line TX and the switch element to be too close, and further result in poor performance.

In at least one embodiment, the included angle between the extending directions of the two linear parts directly connected to the second touch line bending part TB2 and included in the touch signal line TX is in a range of 165° to 175°.

For example, as shown in FIG. 4A, the second touch line bending part TB2 is located in the second region of the first sub-pixel region P11, such that when the array substrate is applied to a display device, the second touch line bending part TB2 is masked by the black matrix layer in the display device, which may further avoid dark state light leakage from being occurred at the second touch line bending part TB2, and the width of the black matrix layer at the second touch line bending part TB2 may be reduced, which is advantageous to improve the transmittance.

In some embodiments of the present disclosure, as shown in FIG. 3 to FIG. 5B, the switch element T may be a transistor, and the transistor includes a gate electrode GE, a source SE and a drain DE, and the drain DE is electrically connected to the pixel electrode PE. For example, the drain DE is electrically connected to the pixel electrode PE through the pixel electrode via hole VHP (as shown in FIGS. 5A-5B). When the switch element T is a transistor, it further includes an active layer AL (as shown in FIG. 5B) electrically connected to the source SE and the drain DE.

In at least one embodiment, as shown in FIG. 3 and FIGS. 4A-4C, the switch element T may be a U-shaped structure, that is, the orthogonal projection of the source SE of the switch element T on the substrate BS includes a U-shaped structure, and the orthogonal projection of the drain DE on the substrate BS extends into the U-shaped structure.

In some other embodiments, in order to meet the requirements of high resolution, as shown in FIG. 5A-5B, the switch element T may also be a linear structure. As shown in FIG. 5B, when the switch element T is a linear structure, the source SE and drain DE are sequentially arranged along the first direction, the active layer AL and the gate electrode GE have a substantially isosceles trapezoid structure, the two non-parallel sides of the isosceles trapezoid are arranged along the second direction, and the two bottoms of the isosceles trapezoid are arranged along the first direction.

The switch element T may be a top gate transistor (the gate electrode GE is located on a side of the active layer away from the substrate BS) or a bottom gate transistor (the gate electrode GE is located on a side of the active layer facing the substrate BS) or a back-channel stop transistor (the transistor includes an etching stop layer to protect the active layer when the source and drain electrode layer is etched). The switch element T may be a thin film transistor such as amorphous silicon thin film transistor, polysilicon thin film transistor or oxide thin film transistor, etc. In some other embodiments, the switch element T may also adopt other types.

As shown in FIGS. 3-4C and FIGS. 5A-5B, the switch element T is located at the cross position of the first display signal line PX1 and the second display signal line PX2, that is, the switch element T is located in the second region of the sub-pixel region to avoid affecting the display.

In some embodiments, as shown in FIGS. 3-4C and FIGS. 5A-5B, a portion of the first display signal line PX1 connected to the switch element T serves as the gate electrode GE. For example, as shown in FIGS. 3-4C and FIGS. 5A-5B, the first display signal line PX1 has a larger width at the position where it intersects the second display signal line PX2, and the portion of the first display signal line PX1 with the larger width serves as the gate electrode GE. In this case, the first display signal line PX1 is a gate line, accordingly, the second display signal line PX2 is a data line.

In some embodiments, as shown in FIGS. 3-4C and FIGS. 5A-5B, a portion of the second display signal line PX2 connected to the switch element T serves as the source electrode SE. In this case, the second display signal line PX2 is a data line, accordingly, the first display signal line PX1 is a gate line.

In at least one embodiment, the source electrode SE, the drain electrode DE, the second display signal line PX2 and the touch signal line TX are located in a same layer. That is, the source electrode SE, the drain electrode DE, the second display signal line PX2 and the touch signal line TX are formed by performing a patterning process on a same film, which may simplify the manufacturing process.

Figure 7A:
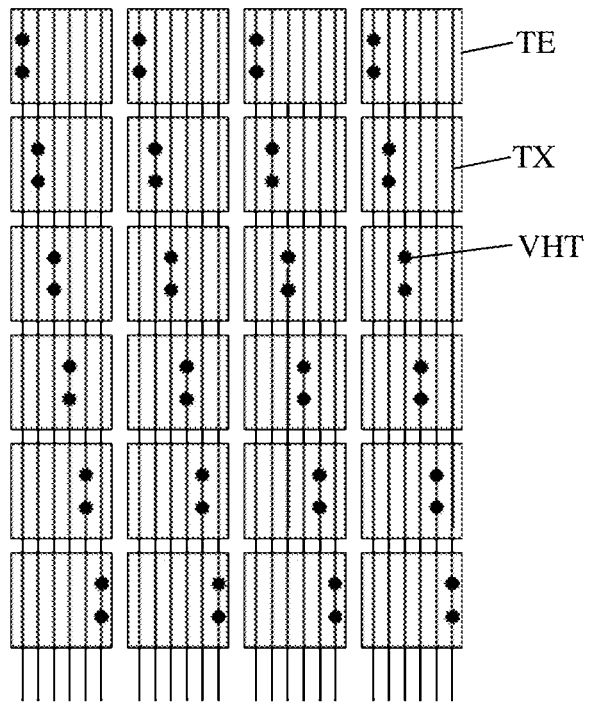
FIG. 7A is a schematic view illustrating a connection relationship between touch electrodes TE and touch signal lines TX in an array substrate provided by the embodiments of the present disclosure.
Figure 7B:
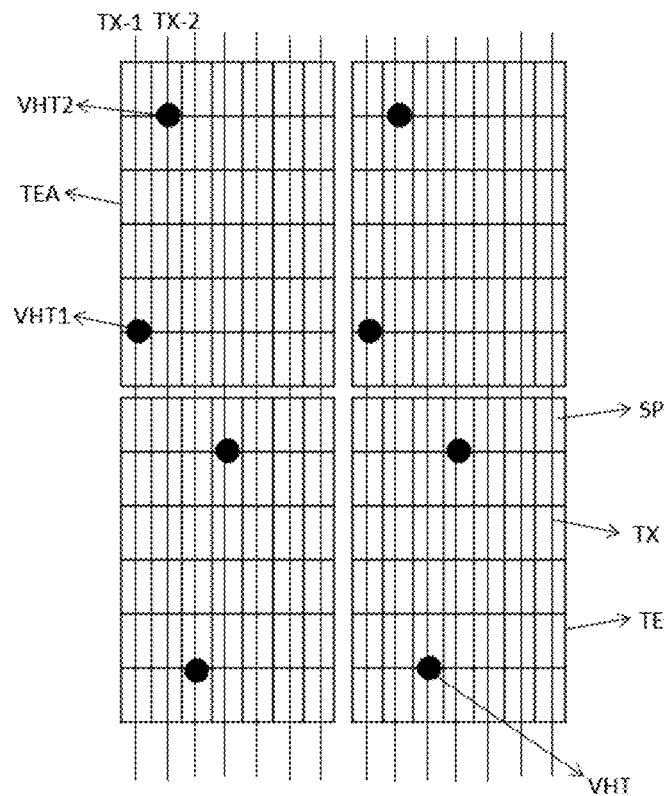
FIG. 7B is a schematic view illustrating a positional relationship between touch line via holes and sub-pixel regions in an array substrate provided by the embodiments of the present disclosure.

FIG. 7A is a schematic view illustrating the connection relationship between the touch electrodes TE and the touch signal lines TX in the array substrate provided by the embodiments of the present disclosure; FIG. 7B is a schematic view illustrating the positional relationship between the touch line via holes and the sub-pixel regions in the array substrate provided by the embodiments of the present disclosure.

In at least one embodiment, as shown in FIG. 7A, each touch signal line TX is electrically connected to the corresponding touch electrode TE through a plurality of touch line via holes VHT (FIG. 7A illustrates two via holes as an example). The electrical connection between each touch signal line TX and the corresponding touch electrode TE is realized through a plurality of via holes, which is advantageous to guarantee a good connection between the touch electrode TE and the touch signal line TX. In some other embodiments, as shown in FIG. 7B, each touch signal line TX may also be electrically connected to the corresponding touch electrode TE through one touch line via hole VHT.

In at least one embodiment, as shown in FIG. 7A, each touch electrode TE is electrically connected to one touch signal line T. In some other embodiments, each touch electrode TE is electrically connected to a plurality of touch signal lines TX. For example, as shown in FIG. 7B, the touch signal line TX-1 is electrically connected to the touch electrode TEA through the touch line via hole VHT1, and the touch signal line TX-2 is electrically connected to the touch electrode TEA through the touch line via hole VHT2, such that signals are supplied to the touch electrode TEA through two touch signal lines TX-1 and TX-2. As described above, through using a plurality of touch signal lines TX to supply signals to the same touch electrode TE, the supply of touch signals may be enhanced, RC delay may be reduced and poor touch strips may be avoided.

In at least one embodiment, as shown in FIG. 7B, there are multiple rows and columns of sub-pixel regions SP in the region where each touch electrode TE is located; the touch line via holes VHT in the region where a same touch electrode TE is located are located at the periphery of the sub-pixel regions SP in different rows and at the periphery of the sub-pixel regions SP in different columns, that is to say, the touch line via holes in the region where a same touch electrode TE is located are staggered in the first direction and staggered in the second direction. As such, the visibility of the touch line via holes VHT may be reduced, thereby improving the uniformity of the display picture.

Figure 8A:
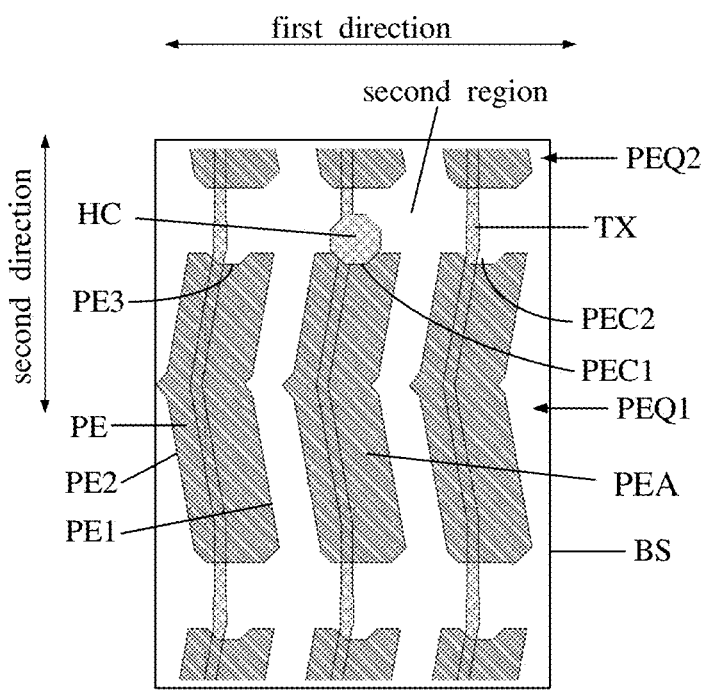
FIG. 8A and FIG. 8B are schematic views illustrating a positional relationship between a touch signal line and a pixel electrode in an array substrate provided by the embodiments of the present disclosure.
Figure 8B:
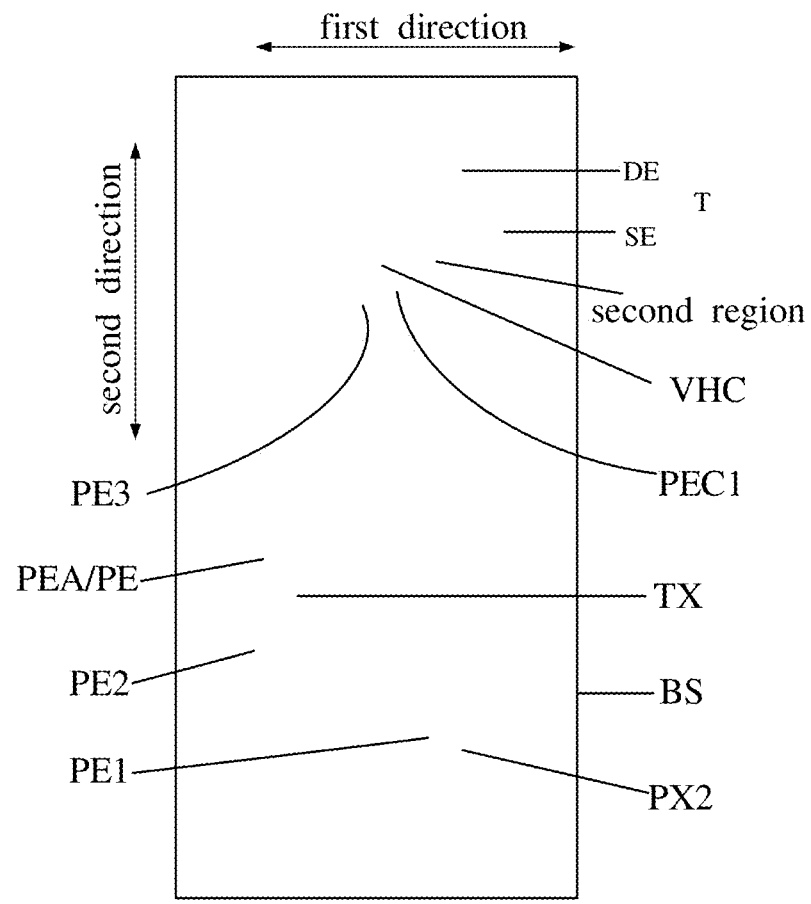

FIG. 8A and FIG. 8B are schematic views illustrating the positional relationship between the touch signal line and the pixel electrode in the array substrate provided by the embodiments of the present disclosure. In at least one embodiment, as shown in FIG. 8A and FIG. 8B, the touch signal line TX includes a via hole connection part HC at the position of the touch line via hole VHT, and the via hole connection part HC is electrically connected to the touch electrode TE (e.g., the common electrode CE), and the size of the via hole connection part HC in the first direction is larger than the size of remaining portions of the touch signal line TX in the first direction. Through disposing the via hole connection part HC with relatively large size, it is advantageous to guarantee a good electrical connection between the touch signal line TX and the touch electrode TE.

In order to avoid affecting the display effect, in at least one embodiment, the orthogonal projection of the touch line via hole VHT on the substrate BS is at least partially located between the orthogonal projections of the adjacent pixel electrodes PE on the substrate BS, accordingly, the orthogonal projection of the via hole connection part HC on the substrate BS is at least partially located between the orthogonal projections of the adjacent pixel electrodes PE on the substrate BS.

During the research, the inventors of the present application found that, the relatively large size in the first direction of the touch signal line TX at the position of touch line via hole VHT (that is, the size of the via hole connection part HC being relatively large) is easy to result in differences in capacitances between pixels. Taking the adjacent first touch signal line and second touch signal line and the adjacent two sub-pixel regions as an example, supposing that the first touch signal line is overlapped with the pixel electrode PE in one sub-pixel region of the two sub-pixel regions and has a via hole connection part HC in the sub-pixel region, and the second touch signal line is overlapped with the pixel electrode PE in the other one sub-pixel region of the two sub-pixel regions and there is free of via hole connection part in the other one sub-pixel region, then the via hole connection part causes that the capacitance between the first touch signal line and the pixel electrode in the one sub-pixel region is greater than the capacitance between the second touch signal line and the pixel electrode in the other one sub-pixel region, thereby resulting in different capacitances corresponding to the two sub-pixel regions. In view of this, in at least one embodiment, as shown in FIG. 8A and FIG. 8B, the orthogonal projection of the via hole connection part HC on the substrate BS is located outside the orthogonal projection of the pixel electrode PE closest to the via hole connection part HC on the substrate BS, that is to say, the orthogonal projection of the via hole connection part HC on the substrate BS is not overlapped with the orthogonal projection of the pixel electrode PE closest to the via hole connection part HC on the substrate BS.

The embodiments of the present disclosure do not limit the shape of the via hole connection part. For example, as shown in FIG. 8A and FIG. 8B, the orthogonal projection of the via hole connection part HC on the substrate BS is octagonal, and the orthogonal projection of the touch signal line TX on the substrate BS passes through the orthogonal projection of the via hole connection part HC. In some other embodiments, the orthogonal projection of the via hole connection part HC on the substrate BS is quadrilateral and is located on a side of the orthogonal projection of the touch signal line TX. In some other embodiments, the orthogonal projection of the via hole connection part HC may also be other polygons or non-polygons.

In at least one embodiment, as shown in FIG. 8A and FIG. 8B, the pixel electrode PE closest to the via hole connection part HC includes a first edge PE1 and a second edge PE2 arranged along the first direction, and includes a third edge PE3 located between the first edge PE1 and the second edge PE2, the third edge PE3 has a first recess PEC1, the orthogonal projection of the first recess PEC1 on the substrate BS accommodates at least a portion of the orthogonal projection of the via hole connection part HC on the substrate BS. Through making the pixel electrode PE include the first recess accommodating the via hole connection part HC, it is advantageous to avoid the orthogonal projection of the pixel electrode PE on the substrate BS from being overlapped with the orthogonal projection of the via hole connection part HC on the substrate BS.

In at least one embodiment, as shown in FIG. 8A and FIG. 8B, the third edge PE3 of the pixel electrode PE is substantially parallel to the edge of the orthogonal projection of the via hole connection part HC at the position of the first recess PEC1.

In at least one embodiment, as shown in FIG. 8A and FIG. 8B, the orthogonal projection of the pixel electrode PE on the substrate BS is a continuous structure without an opening between the first edge PE1 and the second edge PE2 of the pixel electrode PE.

In at least one embodiment, as shown in FIG. 8A, a plurality of pixel electrodes PE included in the array substrate include a first row of pixel electrodes PEQ1 and a second row of pixel electrodes PEQ2 that are adjacent to each other, both the first row of pixel electrodes PEQ1 and the second row of pixel electrodes PEQ2 extend along the first direction and are sequentially arranged along the second direction; both the first row of pixel electrodes PEQ1 and the second row of pixel electrodes PEQ2 intersect at least two touch signal lines TX, and at least one of the at least two touch signal lines TX has a via hole connection part HC between the first row of pixel electrodes PEQ1 and the second row of pixel electrodes PEQ2, and at least another one of the at least two touch signal lines TX does not have a via hole connection part HC between the first row of pixel electrodes PEQ1 and the second row of pixel electrodes PEQ2.

For example, the first row of pixel electrodes PEQ1 is closer to the via hole connection part HC than the second row of pixel electrodes PEQ2, the pixel electrode PE (e.g., the first pixel electrode PEA shown in FIG. 8A) closest to the via hole connection part HC in the first row of pixel electrodes PEQ1 has the first recess PEC1, and the remaining pixel electrodes PE in the first row of pixel electrodes PEQ1 have second recesses PEC2 facing the second row of pixel electrodes PEQ2. Through the second recesses PEC2, it is advantageous to further avoid the difference in capacitances between pixels caused by the via hole connection part HC.

For example, the shape of the second recess PEC2 is the same as the shape of the first recess PEC1, that is, the profiles and sizes of the shapes of the second recess PEC2 and the first recess PEC1 are the same, such that the areas of the orthogonal projections of the first row of pixel electrodes PEQ1 and the second row of pixel electrodes PEQ2 on the substrate BS are substantially the same, so as to further avoid the difference in capacitances between pixels caused by the via hole connection part HC. In some other embodiments, the shapes of the second recess PEC2 and the first recess PEC1 may be different.

In at least one embodiment, each pixel electrode PE in the first row of pixel electrodes PEQ1 and the second row of pixel electrodes PEQ2 is a continuous structure without an opening between the first edge PE1 and the second edge PE2 of the pixel electrode PE.

Figure 9A:
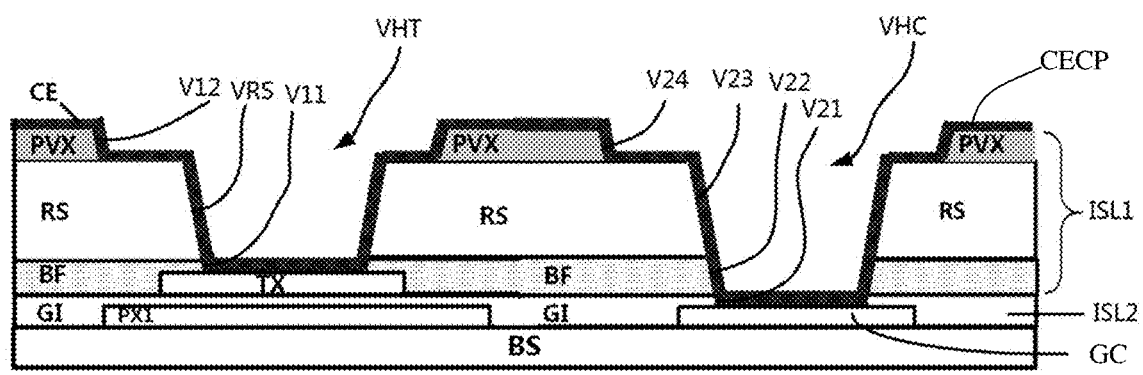
FIG. 9A is a first schematic view illustrating a cross-sectional structure of an array substrate provided by the embodiments of the present disclosure.
Figure 9B:
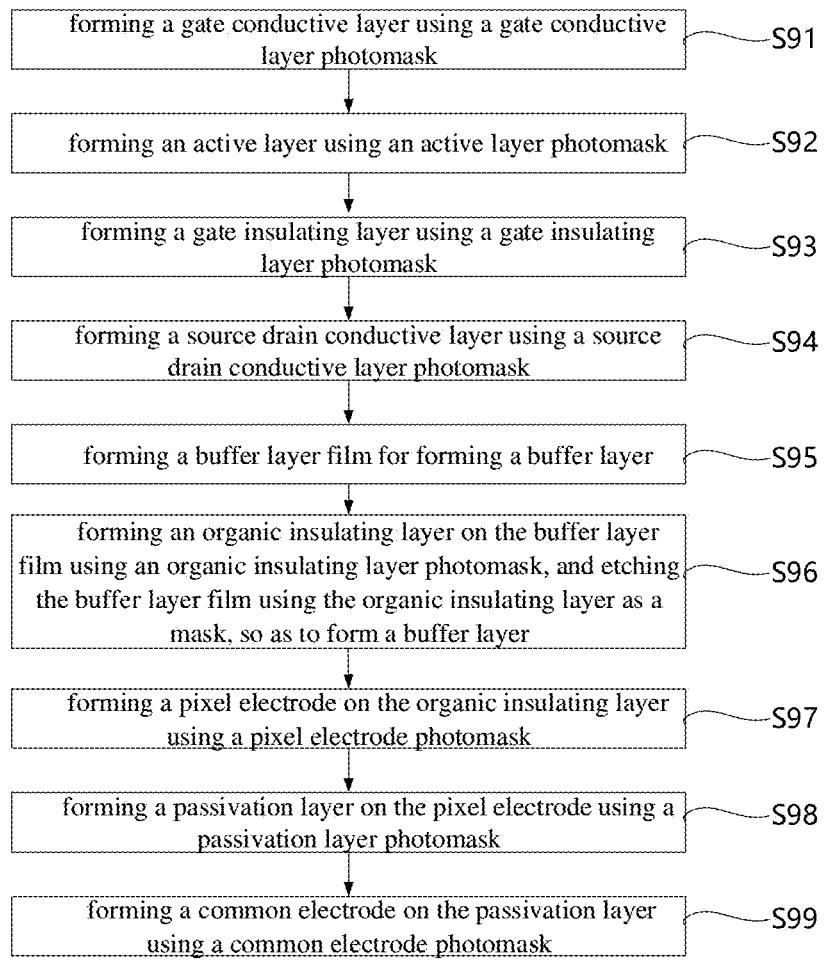
FIG. 9B is a schematic view illustrating manufacturing steps of the array substrate shown in FIG. 9A.
Figure 10:
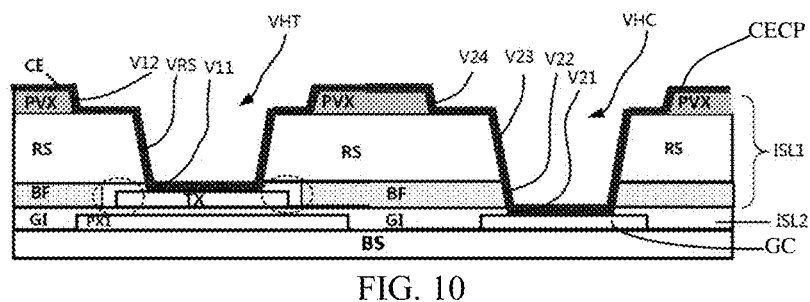
FIG. 10 is a schematic view when the array substrate shown in FIG. 9A is over-etched.
Figure 11A:
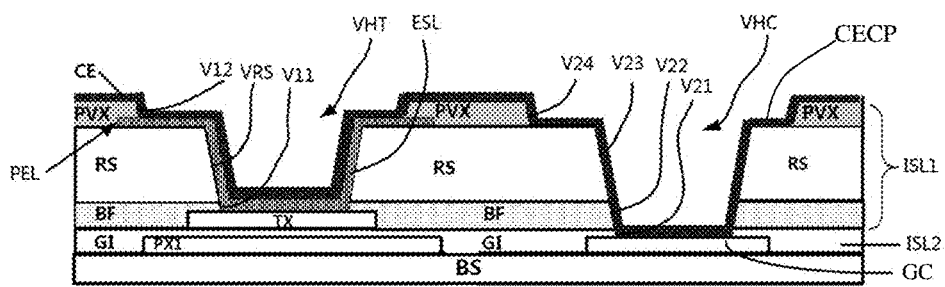
FIG. 11A is a second schematic cross-sectional view of an array substrate provided by the embodiments of the present disclosure.
Figure 11B:
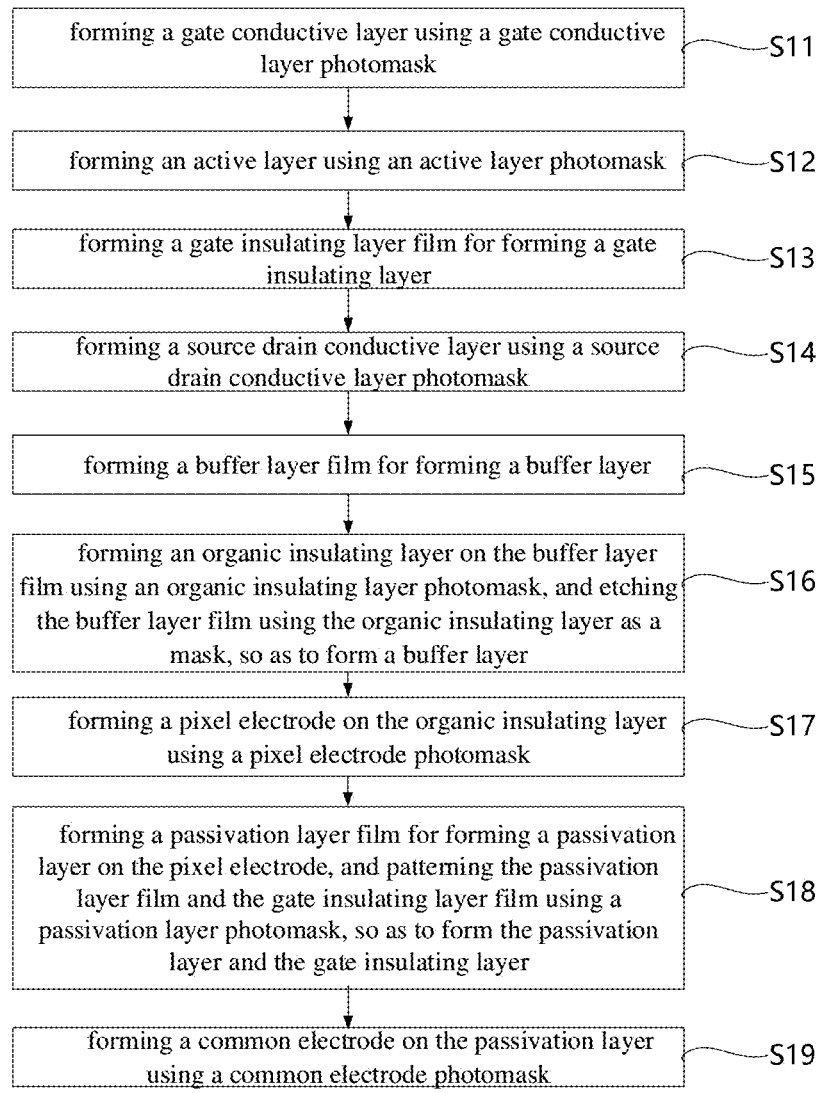
FIG. 11B is a schematic view illustrating manufacturing steps of the array substrate shown in FIG. 11A.

FIG. 9A is a first schematic view illustrating a cross-sectional structure of the array substrate provided by the embodiments of the present disclosure; FIG. 9B is a schematic view illustrating the manufacturing steps of the array substrate shown in FIG. 9A; FIG. 10 is a schematic view when the array substrate shown in FIG. 9A is over-etched; FIG. 11A is a second schematic view illustrating an array substrate provided by the embodiments of the present disclosure; FIG. 11B is a schematic view illustrating the manufacturing steps of the array substrate shown in FIG. 11A.

In at least one embodiment, as shown in FIG. 9A and FIG. 11A, the array substrate includes a first insulating layer ISL1 and a touch electrode (e.g., a common electrode CE) located on the substrate BS, the first insulating layer ISL1 is located between the touch signal line TX and the touch electrode in a direction perpendicular to the substrate BS, and the touch signal line TX is electrically connected to the touch electrode through the touch line via hole VHT penetrating through the first insulating layer ISL1, the orthogonal projection of the touch line via hole VHT on the substrate BS is at least partially located between the orthogonal projections of the adjacent pixel electrodes PE in the second direction on the substrate BS.

In at least one embodiment, the first insulating layer ISL1 may include an organic insulating layer RS, so that the first insulating layer ISL1 may have a large thickness to reduce the capacitance between the touch signal line TX and the touch electrode (e.g., the common electrode CE).

The first insulating layer ISL1 may be a single-layer film structure or a multi-layer film structure. In at least one embodiment, in the case that the first insulating layer ISL1 is a multi-layer structure, the first insulating layer ISL1 may include a first sub-insulating layer, an organic insulating layer and a second sub-insulating layer sequentially located on the substrate BS, and the first sub-insulating layer is located between the organic insulating layer and the substrate BS in a direction perpendicular to the substrate BS. In at least one embodiment, both the first sub-insulating layer and the second sub-insulating layer are inorganic insulating layers. For example, the inorganic insulating layer may include at least one of a silicon oxide layer, a silicon nitride layer and a silicon oxynitride layer, and the first sub-insulating layer and the second sub-insulating layer may be layers of the same material or layers of different materials. For example, as shown in FIG. 9A and FIG. 11A, in the case that the first insulating layer ISL1 is a multi-layer structure, the first insulating layer ISL1 may include a buffer layer BF (an example of the first sub-insulating layer), an organic insulating layer RS and a passivation layer PVX (an example of the second sub-insulating layer) sequentially located on the substrate BS, and the buffer layer BF is located between the organic insulating layer and the substrate BS in a direction perpendicular to the substrate BS, both the buffer layer BF and the passivation layer PVX are inorganic insulating layers.

In the case that the first insulating layer ISL1 is a multi-layer film structure, the touch line via holes VHT penetrating through the first insulating layer ISL1 include a plurality of via holes connected to each other. For example, as shown in FIG. 9A and FIG. 11A, in the case that the first insulating layer ISL1 includes a first sub-insulating layer, an organic insulating layer and a second sub-insulating layer sequentially located on the substrate BS, the touch line via hole VHT includes a first sub-insulating layer via hole V11 located in the first sub-insulating layer, an organic insulating layer via hole VRS located in the organic insulating layer and a second sub-insulating layer via hole V12 located in the second sub-insulating layer, the first sub-insulating layer via hole V11, the organic insulating layer via hole VRS and the second sub-insulating layer via hole V12 are connected to each other.

In at least one embodiment, the range of slope angles of the first sub-insulating layer via hole V11, the organic insulating layer via hole VRS and the second sub-insulating layer via hole V12 may be 30° to 80°. The smaller the slope angles of these via holes are, the less likely the touch electrode is to fall off from the sidewalls of the via holes.

In at least one embodiment, the first sub-insulating layer via hole V11 may be formed using the organic insulating layer RS as a mask, such that the first sub-insulating layer via hole V1 and the organic insulating layer via hole VRS are formed using a same photomask. Through making portions of the via holes included in the touch line via holes VTH be formed of a same photomask, the number of photomasks may be saved and the cost may be reduced. On the other hand, the first sub-insulating layer via hole V11 is formed by using the organic insulating layer RS as a mask, which is advantageous to avoid the over-etching of the first sub-insulating layer via hole V11.

Since the first sub-insulating layer via hole V11 may be formed using the organic insulating layer RS as a mask, in at least one embodiment, the adjacent edges of the first sub-insulating layer via hole V11 and the organic insulating layer via hole VRS are substantially aligned.

In at least one embodiment, since the organic insulating layer via hole VRS and the second sub-insulating layer via hole V12 are formed using different photomasks (i.e., the organic insulating layer RS and the second sub-insulating layer are formed using different photomasks). In at least one embodiment, since the organic insulating layer RS and the second sub-insulating layer are formed using different masks, the sizes of the organic insulating layer via hole VRS and the second sub-insulating layer via hole V12 in the direction parallel to the substrate BS (i.e. the direction parallel to the main surface of the substrate BS) are not equal, such that the touch line via hole VHT has a step structure. In this case, as shown in FIG. 9A and FIG. 11A, the orthogonal projection of the organic insulating layer RS on the substrate BS includes a portion extending into the orthogonal projection of the second sub-insulating layer via hole V12 on the substrate BS.

In at least one embodiment, as shown in FIG. 9A and FIG. 11A, the array substrate further includes a connector GC and a second insulating layer ISL2 located on the substrate BS, the second insulating layer ISL2 is located on the side of the touch signal line TX facing the substrate BS, and the first insulating layer ISL1 is located on the side of the touch signal line TX away from the substrate BS; the connector GC is located on the side of the second insulating layer ISL2 facing the substrate BS, the connector GC is electrically connected to the common electrode CE through the connector via hole VHC penetrating through the second insulating layer ISL2 and the first insulating layer ISL1 and the common electrode connection part CECP located in the connector via hole VHC. The connector GC and the common electrode connection part CECP are used for electrically connect the touch line TX to other components, that is, the connector GC and the common electrode connection part CECP function as an interconnection. The connector GC and the connector via hole VHC are located in the frame region, that is, outside a plurality of sub-pixel regions included in the array substrate.

For example, the connector GC and the first display signal line PX1 are located in the same layer, that is to say, the connector GC and the first display signal line PX1 are formed by patterning a same film, so as to simplify the manufacturing process. For example, the common electrode connection part CECP and the common electrode CE are located in a same layer, that is, they are formed by patterning a same film, so as to simplify the manufacturing process.

Since the second insulating layer ISL2 is located between the touch signal line TX and the substrate BS in the direction perpendicular to the substrate BS, the bottom end of the connector via hole VHC is closer to the substrate BS than the bottom end of the touch line via hole VHT. Therefore, in at least one embodiment, in the case that the insulating layer ISL1 is a multi-layer structure, a portion of insulating layer included in the first insulating layer ISL1 and the second insulating layer ISL2 may be formed using a same photomask, so as to reduce the number of photomasks, thereby reducing the cost.

For example, in the case that the first insulating layer ISL1 includes a first sub-insulating layer, an organic insulating layer and a second sub-insulating layer sequentially located on the substrate BS, as shown in FIG. 9A and FIG. 11A, the connector via hole VHC includes a first sub-via hole V21 located in the second insulating layer ISL2, a second sub-via hole V22 located in the first sub-insulating layer, a third sub-via hole V23 located in the organic insulating layer RS and a fourth sub-via hole V24 located in the second sub-insulating layer, The first sub-via hole V21, the second sub-via hole V22, the third sub-via hole V23 and the fourth sub-via hole V24 are connected to each other.

In at least one embodiment, the second sub-via hole V22 may be formed using the organic insulating layer RS as a mask, such that the adjacent edges of the second sub-via hole V22 and the third sub-via hole V23 are substantially aligned.

Since the organic insulating layer RS and the second sub-insulating layer are formed using different photomasks, in at least one embodiment, the sizes of the third sub-via hole V23 and the fourth sub-via hole V24 in the direction parallel to the substrate BS (i.e. the direction parallel to the main surface of the substrate BS) are not equal, such that the connector via hole VHC has a step structure. For example, as shown in FIG. 9A and FIG. 11A, the orthogonal projection of the organic insulating layer RS on the substrate BS includes a portion extending into the orthogonal projection of the fourth sub-via hole V24 on the substrate BS.

In at least one embodiment, the second insulating layer ISL2 and the second sub-insulating layer may be patterned using a same photomask, that is, the first sub-via hole V21 and the fourth sub-via hole V24 may be formed through a same photomask, so as to reduce the number of photomasks, thereby reducing the manufacturing cost.

For example, both the second sub-insulating layer and the second insulating layer ISL2 are inorganic insulating layers. For example, the inorganic insulating layer may include at least one of a silicon oxide layer, a silicon nitride layer and a silicon oxynitride layer, and the second sub-insulating layer and the second insulating layer ISL2 may be layers of the same material or layers of different materials.

As shown in FIG. 9B, the manufacturing process of the array substrate shown in FIG. 9A includes the following steps S91 to S99.

Step S91: a gate conductive layer is formed on the substrate BS using a gate conductive layer photomask, such that the gate conductive layer includes a gate electrode (not shown in FIG. 9A), a first display signal line PX1 (e.g., a gate line) and a connector GC.

Step S92: an active layer (not shown in FIG. 9A) of switch element is formed on the substrate BS using an active layer photomask.

Step S93: a gate insulating layer film is formed on the substrate BS, and a patterning process is then performed on the gate insulating layer film using a gate insulating layer photomask, so as to form a gate insulating layer GI having a first sub-via hole V21. For example, the thickness of the gate insulating layer film is 4000 Å or other values.

Step S94: a source drain conductive layer is formed on the gate insulating layer GI using a source drain conductive layer photomask, such that the source drain conductive layer includes a source (not shown in FIG. 9A) and a drain (not shown in FIG. 9A) of the switch element, and includes a second display signal line PX2 (e.g., a data line) and a touch signal line TX.

Step S95: a buffer layer film for forming a buffer layer BF is formed on the substrate BS formed with the source drain conductive layer.

Step S96: an organic material layer for forming an organic insulating layer RS is formed on the buffer layer film, and a patterning process is then performed on the organic material layer using an organic insulating layer photomask, so as to form an organic insulating layer RS having an organic insulating layer via hole VRS and a third sub-via hole V23, thereafter, the buffer layer film is etched using the organic insulating layer RS as a mask, so as to form a buffer layer BF having a first sub-insulating layer via hole V11 and a second sub-via hole V22, such that the first sub-insulating layer via hole V11 is connected to the organic insulating layer via hole VRS, and the third sub-via hole V23, the second sub-via hole V22, and the first sub-via hole V21 are connected to each other.

Step S97: a pixel electrode (not shown in FIG. 9A) is formed on the organic insulating layer RS using a pixel electrode photomask, such that the pixel electrode is electrically connected to the drain of the switch element through the pixel electrode via hole VHP (see FIG. 5A) penetrating through the organic insulating layer RS and the buffer layer BF.

Step S98: a passivation layer film for forming a passivation layer PVX is formed on the substrate BS, the passivation layer film covers the pixel electrode, and a patterning process is performed on the passivation layer film to form the passivation layer PVX having a second sub-insulating layer via hole V12 and a fourth sub-via hole V24 using a passivation layer photomask, such that the second sub-insulating layer via hole V12 is connected to the organic insulating layer via hole VRS to obtain the touch line via hole VHT, and the fourth sub-via hole V24 is connected to the third sub-via hole V23 to obtain the connector via hole VHC. For example, the thickness of the passivation layer film is 6000 Å or other values.

Step S99: a common electrode CE is formed on the passivation layer PVX using a common electrode photomask, such that the common electrode CE directly contacts the touch signal line TX at the position of the touch line via hole VHT and directly contacts the connector GC at the position of the connector via hole VHC.

It should be noted that, in the above-described steps S91 to S99, the manufacturing sequence of some steps may be changed. For example, the manufacturing sequence of the step S91 and the step S92 may be exchanged.

During the research, the inventors of the present application noted that, eight photomasks are totally required for the manufacturing process including the above-described steps S91 to S99; the reason why the gate insulating layer GI and the passivation layer PVX are formed using different photomasks is to prevent the buffer layer BF underlying the organic insulating layer RS from being over-etched when etching the passivation layer film (that is, to avoid overetching at the position of first sub-insulating layer via hole V11); if the gate insulating layer GI and the passivation layer PVX are formed using a same photomask (i.e. the passivation layer mask), only one layer of passivation layer film needs to be etched at the position of touch line via hole VHT, while two films including the passivation layer film and the gate insulating layer film for forming the gate insulating layer GI need to be etched at the position of connector via hole VHC, which is easy to cause the over-etching of the buffer layer BF at the position of the touch line via hole VHT. FIG. 10 is a structural schematic view when the buffer layer in the array substrate is over-etched. As shown in FIG. 10, the buffer layer BF is over-etched at the position of the touch line via hole VHT. At the position where the over-etching occurs (as shown by the dotted line), since there is no buffer layer BF to support the common electrode CE in the touch line via hole VHT, the common electrode CE is easy to crack at the touch line via hole VTH.

In order to reduce the number of photomasks on the premise of avoiding over-etching of the first sub-insulating layer (e.g., buffer layer BF), the embodiments of the present disclosure propose an array substrate as shown in FIG. 11A. As shown in FIG. 11A, the array substrate includes a pixel electrode layer PEL located on the substrate BS, the pixel electrode layer PEL includes a pixel electrode PE and includes an etching stop part ESL electrically insulated from the pixel electrode PE, as shown in FIG. 11A and FIG. 5A, the etching stop part ESL is located in the touch line via hole VHT, and the common electrode CE is electrically connected to the touch signal line TX through the etching stop part ESL. For example, the etching stop part ESL directly contacts the touch signal line TX and the common electrode CE respectively located on two sides thereof. Through making the pixel electrode layer PEL includes the pixel electrode and the conductive etching stop part ESL, and making the etching stop part ESL be located in the touch line via hole VHT to electrically connect the common electrode CE to the touch signal line TX, the over-etching of the first sub-insulating layer (e.g., the buffer layer BF) at the position of the touch line via hole VHT may be avoided, and the number of photomasks may be reduced.

For example, the etching stop part ESL at least covers the sidewall of the first sub-insulating layer via hole V11, so as to further avoid the over-etching of the first sub-insulating layer at the position of the touch line via hole VHT.

As shown in FIG. 11B, the manufacturing process of the array substrate shown in FIG. 11A includes the following steps S11 to S19.

Step S11: a gate conductive layer is formed on the substrate BS using a gate conductive layer photomask, such that the gate conductive layer includes a gate electrode (not shown in FIG. 11A), a first display signal line PX1 (e.g., a gate line) and a connector GC.

Step S12: an active layer of switch element is formed on the substrate BS (not shown in FIG. 11A) using an active layer photomask.

Step S13: a gate insulating layer film for forming a gate insulating layer GI is formed on the substrate BS. For example, the thickness of the gate insulating layer film is 4000 Å or other values.

Step S14: a source drain conductive layer is formed on the gate insulating layer film using a source drain conductive layer photomask, such that the source drain conductive layer includes a source (not shown in FIG. 11A) and a drain (not shown in FIG. 11A) of the switch element, and includes a second display signal line PX2 (e.g., a data line) and a touch signal line TX.

Step S15: a buffer layer film for forming a buffer layer BF is formed on the substrate BS formed with the source drain conductive layer.

Step S16: an organic material layer for forming an organic insulating layer RS is formed on the buffer layer film, and a patterning process is then performed on the organic material layer using an organic insulating layer photomask, so as to form the organic insulating layer RS having an organic insulating layer via hole VRS and a third sub-via hole V23, thereafter, an etching process is performed on the buffer layer film using the organic insulating layer RS as a mask, so as to form a buffer layer BF having a first sub-insulating layer via hole V11 and a second sub-via hole V22, such that the first sub-insulating layer via hole V11 is connected to the organic insulating layer via hole VRS, and the third sub-via hole V23 is connected to the second sub-via hole V22.

Step S17: a pixel electrode layer (not shown in FIG. 11A) is formed on the organic insulating layer RS using a pixel electrode photomask, such that the pixel electrode layer includes a pixel electrode and an etching stop part ESL, the pixel electrode is electrically connected to the drain of the switch element through the via hole penetrating through the organic insulating layer RS and the buffer layer BF, and the etching stop part ESL is located in the organic insulating layer via hole VRS and electrically connected to (e.g., directly contact) the touch signal line TX.

Step S18: a passivation layer film for forming a passivation layer PVX is formed on the substrate BS, the passivation layer film covers the pixel electrode, and a patterning process is performed on the passivation layer film and the gate insulating layer film using a passivation layer photomask, so as to form the passivation layer PVX having a second sub-insulating layer via hole V12 and a fourth sub-via hole V24 and a gate insulating layer GI having a first sub-via hole V21, such that the second sub-insulating layer via hole V12, the organic insulating layer via hole VRS and the first sub-insulating layer via hole V11 are connected to obtain the touch line via hole VHT, and the fourth sub-via hole V24, the third sub-via hole V23, the second sub-via hole V22 and the first sub-via hole V21 are connected to obtain the connector via hole VHC. For example, the thickness of the passivation layer film is 6000 Å or other values.

Step S19: a common electrode CE is formed on the passivation layer PVX using a common electrode photomask, such that the common electrode CE is electrically connected to (e.g. directly contact) the etching stop part ESL at the position of the touch line via hole VHT, so as to be electrically connected to the touch signal line TX, and the common electrode CE is electrically connected to (e.g. directly contact) the connector GC at the position of the connector via hole VHC.

It should be noted that, in the above-described steps S11 to S19, the manufacturing sequence of some steps may be changed. For example, the manufacturing sequence of the step S11 and the step S12 may be exchanged.

In view of the above-described steps S11 to S19, the array substrate shown in FIG. 11A may be formed by seven photomasks, which is reduced by one photomask compared to the array substrate shown in FIG. 9A.

The embodiments of the present disclosure also provide a touch display device, which includes an array substrate provided by any one of the above embodiments.

Figure 12A:
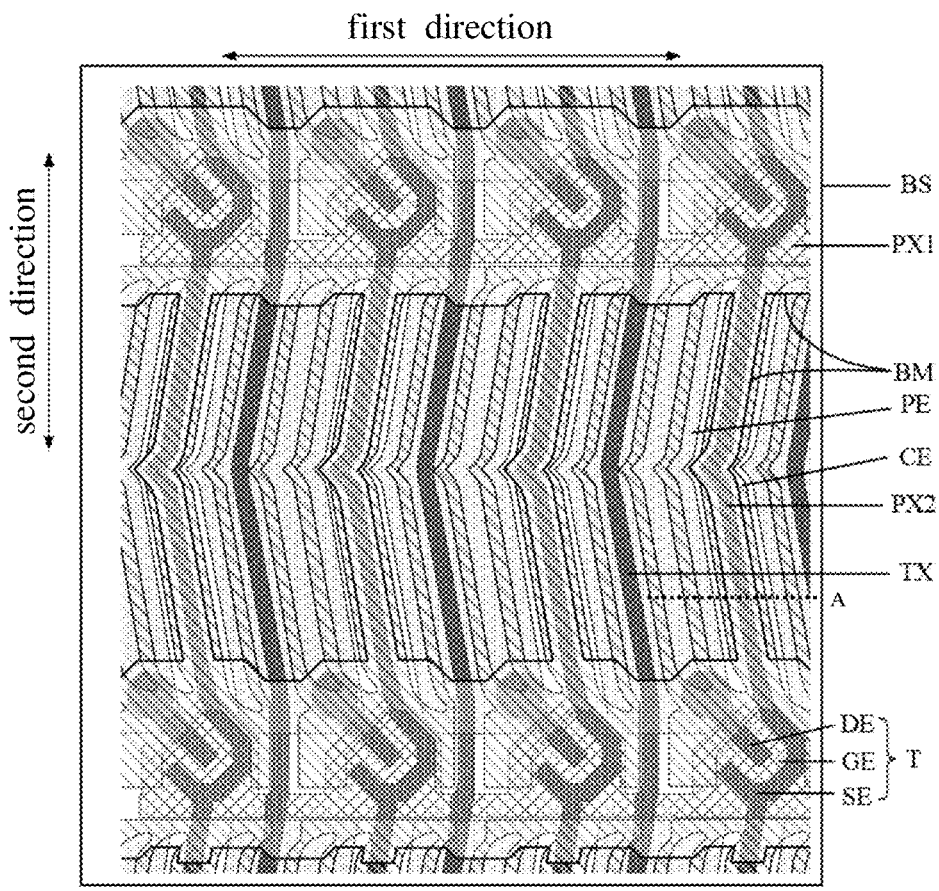
FIG. 12A is a schematic top view of a touch display device provided by the embodiments of the present disclosure.
Figure 12B:
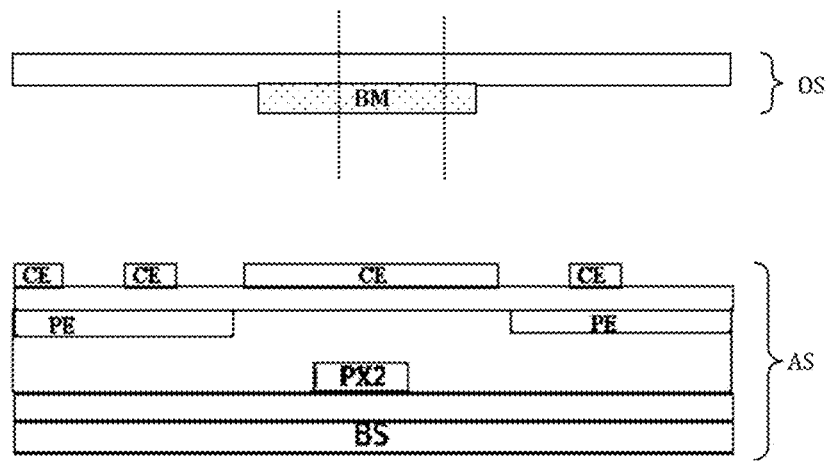
FIG. 12B is a simplified schematic cross-sectional view taken along the dotted line A in FIG. 12A of the touch display device provided by the embodiments of the present disclosure.

FIG. 12A is a top view of a touch display device provided by the embodiments of the present disclosure; FIG. 12B is a simplified schematic cross-sectional view taken along the dotted line A in FIG. 12A of the touch display device provided by the embodiments of the present disclosure. As shown in FIG. 12A and FIG. 12B, the touch display device further includes a black matrix layer BM, a portion of the sub-pixel region not masked by the black matrix layer is an opening region, and a portion of the sub-pixel region masked by the black matrix layer is a non-opening region, and the orthogonal projection of the touch signal line TX in the first sub-pixel region passes through the opening region.

In at least one embodiment, the touch display device is an in-cell touch display device, that is, both the touch electrode and the touch signal line are located in the display panel of the touch display device. For example, as shown in FIG. 12B, the touch display device includes a display panel, the display panel includes an array substrate AS and an opposite substrate OS that are disposed opposite to each other, and a liquid crystal layer (not shown in FIG. 12B) located between the array substrate AS and the opposite substrate OS. In at least one embodiment, the opposite substrate OS includes a black matrix layer BM. In some other embodiments, it may be the array substrate that includes the black matrix layer BM.

All of the via hole connection part HC, the touch signal line via hole VHT, the connector via hole VHC and the second touch line bending part TB2 mentioned in the above embodiments are located in the region masked by the black matrix layer.

For example, the touch display device provided by the embodiments of the present disclosure may be any product or component with touch function and display function, such as liquid crystal panel, electronic paper, mobile phone, tablet computer, television, display, notebook computer, digital photo frame, navigator, etc.

The embodiments of the disclosure further provides a manufacturing method of an array substrate, the manufacturing method includes: forming a second insulating layer film on the substrate for forming a second insulating layer; forming an organic insulating layer having an organic insulating layer via hole on the second insulating layer film; forming a second sub-insulating layer film on the organic insulating layer for forming a second sub-insulating layer, such that the second sub-insulating layer film includes a portion located in the organic insulating layer via hole and covering the second insulating layer film; and performing a patterning process on the second insulating layer film and the second sub-insulating layer film using a same photomask, so as to form the second insulating layer and the second sub-insulating layer. Through using the same photomask to form the second insulating layer and the second sub-insulating layer, the number of photomasks may be reduced to reduce the cost.

In at least one embodiment, the manufacturing method of the array substrate further includes: before forming the organic insulating layer, forming a first sub-insulating layer film on the second insulating layer film for forming a first sub-insulating layer; after the organic insulating layer is formed and before the second sub-insulating layer film is formed, etching the first sub-insulating layer film using the organic insulating layer as a mask, so as to form the first sub-insulating layer. Etching the first sub-insulating layer using the organic insulating layer as the mask is advantageous to reduce the risk of over-etching of the first sub-insulating layer when forming the second insulating layer and the second sub-insulating layer using the same photomask.

Figure 13:
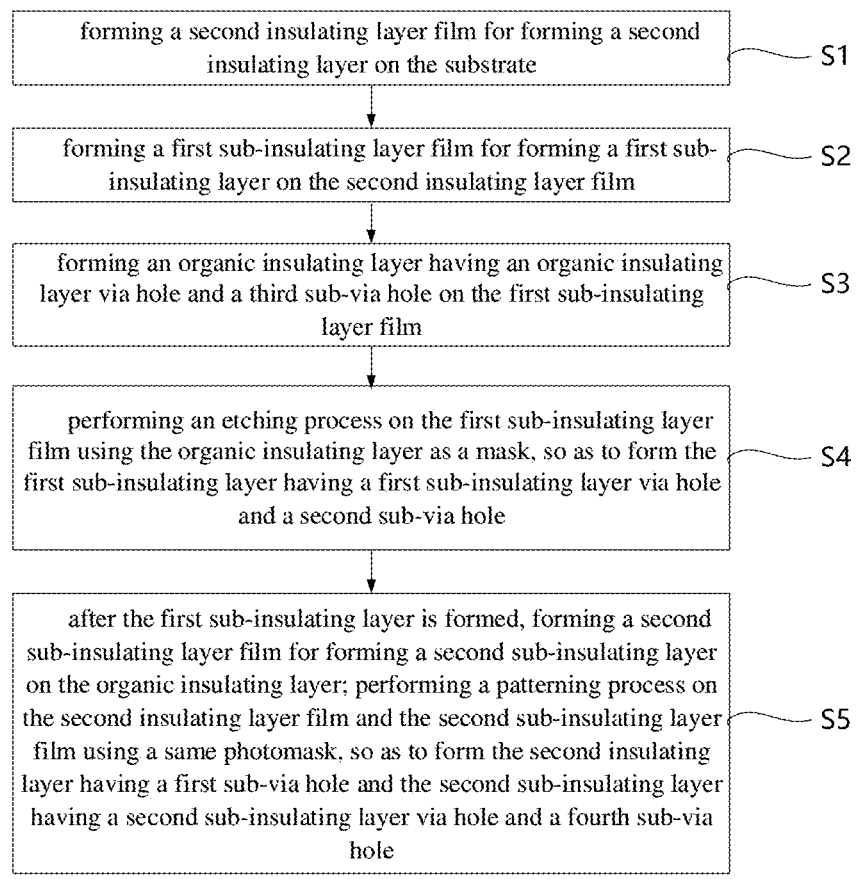
FIG. 13 is a flowchart illustrating a manufacturing method of an array substrate provided by the embodiments of the present disclosure.

FIG. 13 is a flowchart illustrating a manufacturing method of an array substrate provided by an embodiment of the present disclosure. As shown in FIG. 13, in the case that the first sub-insulating layer film is etched using the organic insulating layer as the mask, and the second insulating layer and the second sub-insulating layer are formed using the same photomask, the manufacturing method of the array substrate includes the following steps S1 to S5.

Step S1: a second insulating layer film for forming a second insulating layer is formed on the substrate.

Step S2: a first sub-insulating layer film for forming a first sub-insulating layer is formed on the second insulating layer film.

Step S3: an organic insulating layer having an organic insulating layer via hole and a third sub-via hole is formed on the first sub-insulating layer film.

Step S4: an etching process is performed on the first sub-insulating layer film using the organic insulating layer as a mask, so as to form the first sub-insulating layer having a first sub-insulating layer via hole and a second sub-via hole, such that the first sub-insulating layer via hole is connected to the organic insulating layer via hole, and the second sub-via hole is connected to the third sub-via hole.

Step S5: after the first sub-insulating layer is formed, a second sub-insulating layer film for forming a second sub-insulating layer is formed on the organic insulating layer, such that the second sub-insulating layer film includes a portion located in the organic insulating layer via hole and covering the second insulating layer film; further, a patterning process is performed on the second insulating layer film and the second sub-insulating layer film using a same photomask, so as to form the second insulating layer having a first sub-via hole and the second sub-insulating layer having a second sub-insulating layer via hole and a fourth sub-via hole, such that the first sub-via hole is connected to the second sub-via hole, the second sub-insulating layer via hole is connected to the organic insulating layer via hole, and the fourth sub-via hole is connected to the third sub-via hole.

In at least one embodiment, as shown in FIG. 11A, the array substrate further includes an etching stop part ESL, such that the touch signal line TX is electrically connected to the common electrode CE through the etching stop part ESL, thereby reducing the number of photomasks on the premise of avoiding over-etching of the first sub-insulating layer. In this case, the manufacturing method of the array substrate further includes: after forming the organic insulating layer and before forming the second sub-insulating layer film, a pixel electrode layer is formed on the substrate having the organic insulating layer, such that the pixel electrode layer includes a pixel electrode and an etching stop part electrically insulated from the pixel electrode.

For example, the second insulating layer, the first sub-insulating layer and the second sub-insulating layer may respectively be the gate insulating layer GI, the buffer layer BF and the passivation layer PVX in the embodiments shown in FIG. 9A and FIG. 11A. In some other embodiments, the second insulating layer, the first sub-insulating layer and the second sub-insulating layer may also be other layers, respectively.

For example, in the case that the second insulating layer, the first sub-insulating layer and the second sub-insulating layer are respectively the gate insulating layer GI, the buffer layer BF and the passivation layer PVX in the embodiment shown in FIG. 9A, the manufacturing method provided by the embodiments of the present disclosure includes the above-described steps S91 to S99; in the case that the second insulating layer, the first sub-insulating layer and the second sub-insulating layer are respectively the gate insulating layer GI, the buffer layer BF and the passivation layer PVX in the embodiment shown in FIG. 11A, the manufacturing method provided by the embodiments of the present disclosure includes the above-described steps S11 to S19. The repetition will not be described again here.

In the array substrate and the manufacturing method thereof and the touch display device provided by the embodiments of the present disclosure, the same component may adopt the same setting mode.

The embodiments of the present disclosure and the features in the embodiments may be combined with each other without contradiction.

The above description is merely exemplary embodiments of the present disclosure and does not intend to limit the scope of protection of the present disclosure, and the scope of protection of the present disclosure is determined by the accompanying claims.

The invention claimed is:

1. An array substrate, comprising:
a substrate;
a plurality of first display signal lines and a plurality of second display signal lines on the substrate, wherein the plurality of first display signal lines extend along a first direction and are sequentially arranged along a second direction different from the first direction, and the plurality of second display signal lines extend along the second direction and are sequentially arranged along the first direction, the plurality of second display signal lines intersect the plurality of first display signal lines to define a plurality of sub-pixel regions;
a touch signal line on the substrate, wherein the touch signal line extends along the second direction;
a first insulating layer and a common electrode on the substrate, wherein the first insulating layer is located between the touch signal line and the common electrode in a direction perpendicular to the substrate, and the touch signal line is electrically connected to the common electrode through a touch line via hole penetrating through the first insulating layer; and
a plurality of pixel electrodes on the substrate, wherein the plurality of pixel electrodes are respectively located in the plurality of sub-pixel regions, wherein the plurality of sub-pixel regions comprise a first sub-pixel region, the plurality of pixel electrodes comprise a first pixel electrode, the first pixel electrode is located within the first sub-pixel region, and the first pixel electrode comprises a first edge and a second edge arranged along the first direction and extending along the second direction, an orthogonal projection of the touch signal line on the substrate is located between orthogonal projections of the first edge and the second edge on the substrate;
an orthogonal projection of the touch line via hole on the substrate is at least partially located between orthogonal projections of adjacent pixel electrodes on the substrate, the touch signal line comprises a via hole connection part electrically connected to the common electrode at the touch line via hole, and a size of the via hole connection part in the first direction is greater than a size of a portion included in the touch signal line in the first direction, and the portion included in the touch signal line is adjacent to the via hole connection part;
the first pixel electrode is a pixel electrode closest to the via hole connection part among the plurality of pixel electrodes, the first pixel electrode further comprises a third edge between the first edge and the second edge, the third edge extends along the first direction, and the third edge has a first recess, an orthogonal projection of the first recess on the substrate accommodates at least a portion of an orthogonal projection of the via hole connection part on the substrate.

2. The array substrate according to claim 1, wherein the first sub-pixel region comprises a first region and a second region surrounding the first region;
in the first direction, distances between the orthogonal projection of the touch signal line and two second display signal lines adjacent to the touch signal line in the first region are not equal.

3. The array substrate according to claim 1, wherein the array substrate comprises a plurality of touch signal lines, and the orthogonal projection of one of the plurality of touch signal lines on the substrate is located between the orthogonal projections of the first edge and the second edge included in the first pixel electrode in the first sub-pixel region in each column of sub-pixel regions on the substrate.

4. The array substrate according to claim 1, wherein an orthogonal projection of the via hole connection part on the substrate is not overlapped with an orthogonal projection of the first pixel electrode on the substrate, wherein an edge of the first recess is parallel to an edge of the via hole connection part adjacent thereto.

5. The array substrate according to claim 1, wherein the array substrate comprises a plurality of touch signal lines on the substrate;
the plurality of pixel electrodes comprise a first row of pixel electrodes and a second row of pixel electrodes that are adjacent to each other, both the first row of pixel electrodes and the second row of pixel electrodes extend along the first direction and are sequentially arranged along the second direction;
both the first row of pixel electrodes and the second row of pixel electrodes intersect at least two touch signal lines, at least one of the at least two touch signal lines has the via hole connection part between the first row of pixel electrodes and the second row of pixel electrodes, and at least another one of the at least two touch signal lines does not have the via hole connection part between the first row of pixel electrodes and the second row of pixel electrodes.

6. The array substrate according to claim 5, wherein the first row of pixel electrodes is closer to the via hole connection part than the second row of pixel electrodes, and a pixel electrode closest to the via hole connection part among the first row of pixel electrodes has the first recess, wherein a pixel electrode adjacent to the pixel electrode closest to the via hole connection part in the first row of pixel electrodes has a second recess facing the second row of pixel electrodes.

7. The array substrate according to claim 1, wherein the array substrate comprises a first electrode, the first electrode is the common electrode or the first pixel electrode, the first electrode comprises a plurality of strip electrodes, and the plurality of strip electrodes extend along the second direction;
    in the first sub-pixel region, the orthogonal projection of the touch signal line is at least partially located between orthogonal projections of adjacent strip electrodes in the first direction on the substrate.

8. An array substrate, comprising:
    a substrate;
    a plurality of first display signal lines and a plurality of second display signal lines on the substrate, wherein the plurality of first display signal lines extend along a first direction and are sequentially arranged along a second direction different from the first direction, and the plurality of second display signal lines extend along the second direction and are sequentially arranged along the first direction, the plurality of second display signal lines and the plurality of first display signal lines intersect to define a plurality of sub-pixel regions;
    a touch signal line on the substrate, wherein the touch signal line extends along the second direction;
    a common electrode on the substrate, and electrically connected to the touch signal line; and
    a plurality of pixel electrodes on the substrate, wherein the plurality of pixel electrodes are respectively located in the plurality of sub-pixel regions,
    wherein the plurality of sub-pixel regions comprise a first sub-pixel region, the plurality of pixel electrodes comprise a first pixel electrode, the first pixel electrode is located in the first sub-pixel region, and the first pixel electrode comprises a first edge and a second edge arranged along the first direction and extending along the second direction, an orthogonal projection of the touch signal line on the substrate is located between orthogonal projections of the first edge and the second edge on the substrate;
    the array substrate comprises a first electrode, the first electrode is the common electrode or the first pixel electrode, the first electrode comprises a plurality of strip electrodes, and the plurality of strip electrodes extend along the second direction; in the first sub-pixel region, the orthogonal projection of the touch signal line is at least partially located between orthogonal projections of adjacent strip electrodes in the first direction on the substrate;
    the first sub-pixel region comprises a first region and a second region surrounding the first region;
    the plurality of strip electrodes comprise a first strip electrode adjacent to the touch signal line, the first strip electrode has a first strip electrode bending part in the first region, the touch signal line has a first touch line bending part in the first region, the first touch line bending part and the first strip electrode bending part bend toward a same direction in the first region, an orthogonal projection of the first touch line bending part on the substrate and an orthogonal projection of the first strip electrode bending part on the substrate are sequentially arranged in the first direction, and a bending angle of the first touch line bending part is greater than a bending angle of the first strip electrode bending part.

9. The array substrate according to claim 8, wherein the first strip electrode bending part is located on a first side of the first touch line bending part, and the first touch line bending part bend along a direction away from the first strip electrode bending part; along a direction from one end to another end of the first strip electrode, an distance between the orthogonal projection of the first touch line bending part and the orthogonal projection of the first strip electrode bending part firstly decreases and then increases.

10. The array substrate according to claim 8, wherein the first strip electrode bending part has a sharp end extending towards the first touch line bending part, and the first touch line bending part has an arced end extending in a direction away from the sharp end, wherein the orthogonal projection of the first strip electrode bending part is not overlapped with the orthogonal projection of the first touch line bending part.

11. The array substrate according to claim 8, wherein the plurality of strip electrodes further comprises a second strip electrode adjacent to the touch signal line, the second strip electrode has a second strip electrode bending part in the first region, the first strip electrode bending part, the second strip electrode bending part and the first touch line bending part located therebetween bend toward a same direction in the first region, an orthogonal projection of the second strip electrode bending part on the substrate and the orthogonal projection of the first touch line bending part are sequentially arranged in the first direction, and a bending angle of the second strip electrode bending part is less than a bending angle of the first touch line bending part.

12. The array substrate according to claim 8, further comprising a plurality of switch elements on the substrate, wherein the plurality of switch elements are respectively located in the plurality of sub-pixel regions, the plurality of switch elements comprise a first switch element, and the first switch element is located in the first sub-pixel region,
    the touch signal line has a second touch line bending part, the second touch line bending part is located between the first touch line bending part and the first switch element in the second direction, and the second touch line bending part is located between adjacent switch elements in the first direction, wherein a bending angle of the second touch line bending part is greater than a bending angle of the first touch line bending part.

13. The array substrate according to claim 12, wherein the first strip electrode has a third strip electrode bending part, the third strip electrode bending part is located between the second touch line bending part and the first switch element in the first direction, and a bending direction of the third strip electrode bending part is opposite to a bending direction of the second touch line bending part.

14. The array substrate according to claim 12, wherein each switch element comprises a gate electrode, a source electrode and a drain electrode, and an orthogonal projection of the source on the substrate comprises a U-shaped structure.

15. An array substrate, comprising:
    a substrate;
    a plurality of first display signal lines and a plurality of second display signal lines on the substrate, wherein the plurality of first display signal lines extend along a first direction and are sequentially arranged along a second direction different from the first direction, the plurality of second display signal lines extend along the second direction and are sequentially arranged along the first direction, the plurality of second display signal lines and the first display signal line intersect to define a plurality of sub-pixel regions;

a touch signal line on the substrate, wherein the touch signal line extends along the second direction;

a first insulating layer and a common electrode on the substrate, wherein the first insulating layer is located between the touch signal line and the common electrode in a direction perpendicular to the substrate, and the touch signal line is electrically connected to the common electrode through a touch line via hole penetrating the first insulating layer; and a plurality of pixel electrodes on the substrate, wherein the plurality of pixel electrodes are respectively located in the plurality of sub-pixel regions, wherein the plurality of sub-pixel regions comprise a first sub-pixel region, the plurality of pixel electrodes comprise a first pixel electrode, the first pixel electrode is located in the first sub-pixel region, and the first pixel electrode comprises a first edge and a second edge arranged along the first direction and extending along the second direction, an orthogonal projection of the touch signal line on the substrate is located between orthogonal projections of the first edge and the second edge on the substrate;

the array substrate comprises a pixel electrode layer on the substrate, the pixel electrode layer comprises the plurality of pixel electrodes and comprises an etching stop part insulated from the plurality of pixel electrodes, the etching stop part is located in the touch line via hole, and the common electrode is electrically connected to the touch signal line through the etching stop part.

16. The array substrate according to claim 15, wherein the first insulating layer comprises a first sub-insulating layer, an organic insulating layer and a second sub-insulating layer sequentially located on the substrate, and the first sub-insulating layer is located between the organic insulating layer and the substrate in a direction perpendicular to the substrate;

the touch line via hole comprises a first sub-insulating layer via hole in the first sub-insulating layer, an organic insulating layer via hole in the organic insulating layer and a second sub-insulating layer via hole in the second sub-insulating layer, the first sub-insulating layer via hole, the organic insulating layer via hole and the second sub-insulating layer via hole are connected to each other, and the etching stop part at least covers a sidewall of the first sub-insulating layer via hole.

17. The array substrate according to claim 16, wherein adjacent edges of the first sub-insulating layer via hole and the organic insulating layer via hole are aligned with each other, wherein an orthogonal projection of the organic insulating layer on the substrate comprises a portion extending into an orthogonal projection of the second sub-insulating layer via hole on the substrate.

18. The array substrate according to claim 16, further comprising: a connector and a second insulating layer on the substrate, wherein the second insulating layer is located on a side of the touch signal line facing the substrate, and the first insulating layer is located on a side of the touch signal line away from the substrate;

the connector is located on a side of the second insulating layer facing the substrate, and the connector is electrically connected to the common electrode through a connector via hole penetrating through the second insulating layer and the first insulating layer.

19. The array substrate according to claim 18, wherein the connector via hole comprises a first sub-via hole in the second insulating layer, a second sub-via hole in the first sub-insulating layer, a third sub-via hole in the organic insulating layer and a fourth sub-via hole in the second sub-insulating layer, the first sub-via hole, the second sub-via hole, the third sub-via hole and the fourth sub-via hole are connected to each other.

20. A touch display device, comprising:
the array substrate according to claim 1; and
a black matrix layer, wherein a portion of the first sub-pixel region surrounded by the black matrix layer is an opening region, and an orthogonal projection of the touch signal line on the first sub-pixel region passes through the opening region.

* * * * *